US009141696B2

(12) United States Patent
Sasaki et al.

(10) Patent No.: US 9,141,696 B2
(45) Date of Patent: Sep. 22, 2015

(54) COMMUNICATION DEVICE

(75) Inventors: Hiroyuki Sasaki, Chita (JP); Takao Seki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 190 days.

(21) Appl. No.: 12/537,668

(22) Filed: Aug. 7, 2009

(65) Prior Publication Data
US 2010/0036855 A1 Feb. 11, 2010

(30) Foreign Application Priority Data

Aug. 7, 2008 (JP) ................................. 2008-203884
Sep. 24, 2008 (JP) ................................. 2008-243945

(51) Int. Cl.
*G06F 7/00* (2006.01)
*G06F 17/30* (2006.01)

(52) U.S. Cl.
CPC ............................... *G06F 17/30861* (2013.01)

(58) Field of Classification Search
CPC ................... G06F 17/30575; G06F 17/30174; G06F 17/30194
USPC .......... 707/628, 636, 741, 752; 725/119, 131, 725/133, 139, 141
See application file for complete search history.

(56) References Cited

U.S. PATENT DOCUMENTS

| | | | |
|---|---|---|---|
| 5,933,142 A | 8/1999 | LaStrange et al. | |
| 5,999,698 A * | 12/1999 | Nakai et al. | 386/230 |
| 6,249,817 B1 * | 6/2001 | Nakabayashi et al. | 709/224 |
| 7,088,234 B2 * | 8/2006 | Naito et al. | 340/539.11 |
| 7,401,294 B2 | 7/2008 | Chang et al. | |
| 7,548,915 B2 * | 6/2009 | Ramer et al. | 705/14.54 |
| 7,962,546 B2 | 6/2011 | Colon | |
| 2002/0069239 A1 | 6/2002 | Katada et al. | |
| 2002/0073235 A1 | 6/2002 | Chen et al. | |
| 2002/0143936 A1 | 10/2002 | Yu | |
| 2003/0078038 A1 * | 4/2003 | Kurosawa et al. | 455/422 |
| 2003/0105869 A1 * | 6/2003 | Matsui et al. | 709/227 |

(Continued)

FOREIGN PATENT DOCUMENTS

| | | |
|---|---|---|
| JP | 10056491 A | 2/1998 |
| JP | 11212995 A | 8/1999 |

(Continued)

OTHER PUBLICATIONS

Notification for Reasons for Rejection for Japanese Patent Application No. 2008-302657 mailed Aug. 31, 2010.

(Continued)

*Primary Examiner* — Mark E Hershley
(74) *Attorney, Agent, or Firm* — Merchant & Gould PC

(57) ABSTRACT

A communication device may be configured to be connected with an information display device in a communicable manner. The communication device may store address information of summarized content information, wherein the summarized content information includes, for each of a plurality of contents, at least address information of the content and a title of the content. The communication device may acquire the summarized content information from the address information, display the titles of the plurality of contents included in the summarized content information, allow a user to select at least one title from the titles of the plurality of contents, and send information concerning a content corresponding to the selected title.

16 Claims, 16 Drawing Sheets

(56) References Cited

U.S. PATENT DOCUMENTS

| | | | |
|---|---|---|---|
| 2003/0110214 A1* | 6/2003 | Sato | 709/203 |
| 2003/0110266 A1 | 6/2003 | Rollins et al. | |
| 2003/0184793 A1 | 10/2003 | Pineau | |
| 2003/0195963 A1 | 10/2003 | Song et al. | |
| 2004/0133847 A1* | 7/2004 | Iino et al. | 715/500 |
| 2005/0066037 A1 | 3/2005 | Song et al. | |
| 2005/0097214 A1 | 5/2005 | Chen et al. | |
| 2005/0144032 A1* | 6/2005 | Shimoda et al. | 705/1 |
| 2005/0289468 A1 | 12/2005 | Kahn et al. | |
| 2006/0079214 A1 | 4/2006 | Mertama et al. | |
| 2006/0112102 A1 | 5/2006 | Shafron | |
| 2006/0182418 A1* | 8/2006 | Yamagata et al. | 386/95 |
| 2007/0049258 A1* | 3/2007 | Thibeault | 455/414.1 |
| 2007/0083468 A1 | 4/2007 | Wetherell | |
| 2007/0086051 A1 | 4/2007 | Kunori | |
| 2007/0112934 A1 | 5/2007 | Inoue et al. | |
| 2007/0136673 A1 | 6/2007 | Minamida | |
| 2007/0136778 A1* | 6/2007 | Birger et al. | 725/117 |
| 2007/0174423 A1 | 7/2007 | Yoshida | |
| 2007/0226734 A1 | 9/2007 | Lin et al. | |
| 2007/0250643 A1 | 10/2007 | Pyhalammi et al. | |
| 2008/0036757 A1* | 2/2008 | Furukawa et al. | 345/418 |
| 2008/0037050 A1 | 2/2008 | Sasaki | |
| 2008/0037062 A1* | 2/2008 | Omino et al. | 358/1.15 |
| 2008/0060043 A1 | 3/2008 | Malik | |
| 2008/0082941 A1 | 4/2008 | Goldberg et al. | |
| 2008/0140674 A1 | 6/2008 | Ishikawa | |
| 2008/0160974 A1 | 7/2008 | Vartiainen et al. | |
| 2008/0274767 A1* | 11/2008 | Sainton et al. | 455/552.1 |
| 2009/0006477 A1* | 1/2009 | Oshita et al. | 707/104.1 |
| 2009/0013071 A1 | 1/2009 | Matoba et al. | |
| 2009/0031375 A1* | 1/2009 | Sullivan et al. | 725/105 |
| 2009/0060509 A1 | 3/2009 | Shimoosako et al. | |
| 2009/0083373 A1 | 3/2009 | Matoba et al. | |

FOREIGN PATENT DOCUMENTS

| | | | |
|---|---|---|---|
| JP | 2000-122957 | | 4/2000 |
| JP | 2001-111607 | | 4/2001 |
| JP | 2001265686 | A | 9/2001 |
| JP | 2002092035 | A | 3/2002 |
| JP | 2002-099557 | | 4/2002 |
| JP | 2002-247239 | | 8/2002 |
| JP | 2002-268968 | | 9/2002 |
| JP | 2002-278871 | | 9/2002 |
| JP | 2002-297492 | | 10/2002 |
| JP | 2002351765 | A | 12/2002 |
| JP | 2003076707 | A | 3/2003 |
| JP | 2003-108472 | | 4/2003 |
| JP | 2004096158 | A | 3/2004 |
| JP | 2004098413 | A | 4/2004 |
| JP | 2005-157565 | | 6/2005 |
| JP | 2005520255 | T | 7/2005 |
| JP | 2006215741 | A | 8/2006 |
| JP | 2006243985 | A | 9/2006 |
| JP | 2006260343 | A | 9/2006 |
| JP | 2006-277276 | | 10/2006 |
| JP | 2006344073 | A | 12/2006 |
| JP | 2007141215 | A | 6/2007 |
| JP | 2007157073 | A | 6/2007 |
| JP | 2007158613 | A | 6/2007 |
| JP | 2007164389 | A | 6/2007 |
| JP | 2007-237472 | | 9/2007 |
| JP | 2008022548 | A | 1/2008 |
| JP | 04-044127 | | 2/2008 |
| JP | 2008-040991 | | 2/2008 |
| JP | 2008-067346 | | 3/2008 |
| JP | 2008071169 | A | 3/2008 |
| JP | 2008-278266 | | 11/2008 |
| JP | 2009015713 | A | 1/2009 |
| JP | 2009075967 | A | 4/2009 |
| WO | 03079279 | A1 | 9/2003 |

OTHER PUBLICATIONS

Notification for Reasons for Rejection for Japanese Patent Application No. 2008-243945 mailed Sep. 28, 2010.

"Dirty News Reader displays titles of distributed articles on RSS sites like an electronic signboard" May 26, 2004. Impress Corporation, Tomoyuki Otsu.

Decision of Rejection received in corresponding Japanese Application No. 2008-203884 mailed Aug. 17, 2010.

Notification of Reasons for Rejection in corresponding Japanese Application No. 2008-203884 dated May 25, 2010.

Co-pending U.S. Appl. No. 12/625,584.

U.S. Office Action dated Dec. 13, 2011, corresponding U.S. Appl. No. 12/625,584.

European Office Action for application No. 09251960.2 mailed Aug. 29, 2011.

European Patent Office, Extended European Search Report in counterpart EP Patent Application No. 13182070,6, dated Oct. 15, 2013.

Notice of Allowance dated Apr. 2, 2012 in corresponding U.S. Appl. No. 12/625,584.

European Office Action issued in EP 09 251 960.2, mailed Apr. 9, 2014.

European Search Report for Application No. 09251960.2-2201 mailed on Dec. 2, 2009.

NetNews Wire 3.1 for Mac OS X, Online article XP002556295, Jul. 30, 2008, pp. 1-3, <http://web.archive.org/web/20080730165103/www.newsgator.com/Individuals/NetNewsWire/Default.aspx>.

Chinese Office Action issued in Application No. 201310088643.1, mailed Feb. 2, 2015.

Copy of related U.S. Appl. No. 12/625,584, as filed on Nov. 25, 2009.

Office Action issued in related U.S. Appl. No. 13/559,368, May 21, 2015.

* cited by examiner

FIG. 5

Running PC Information Storage Area 47

| | Destination PC | PC Running Flag | Destination Mail Address1 | Destination Mail Address2 | Destination Mail Address3 |
|---|---|---|---|---|---|
| 150 → | Note-PC1 | ON | pc1@sample.com | pc-2nd@sample.com | pc1-3rd@sample.com |
| 152 → | Note-PC2 | OFF | pc2@sample.com | | |
| 154 → | DeskTop-PC3 | OFF | | | |

(155) (156) (157) (158) (159)

COMMUNICATION DEVICE

CROSS-REFERENCE TO RELATED APPLICATION

This application claims priority to Japanese Patent Application No. 2008-203884, filed on Aug. 7, 2008, and Japanese Patent Application No. 2008-243945, filed on Sep. 24, 2008, the contents of which are hereby incorporated by reference into the present application.

BACKGROUND

1. Field

The present specification discloses a communication device that displays a title of content published on a network.

2. Description of the Related Art

A variety of content is published on networks. There is a server that publishes summarized content information including a URL and a title of each content. One example of summarized content information is feed information. Formats for feed information include, for example, RSS and Atom. A software for acquiring feed information and displaying a plurality of contents is disclosed on a website (www-.forest.impress.co.jp/article/2004/05/26/dirtynewsreader.html) located on the Internet on Jul. 29, 2008, titled "Dirty News Reader displays titles of distributed articles on RSS sites like an electronic signboard", published May 26, 2004 by Impress Corporation and written by Tomoyuki Otsu. When this software is installed on a PC, a user can view the title of each content. When a user clicks on a title, the PC will open a browser, and will access the URL of the content corresponding to that title. In this way, the content will be displayed on the PC.

BRIEF SUMMARY

Summarized content information can be viewed without problem even on a comparatively small display unit, because the summarized content information is summarized information (title, etc.) from the content. However, the content may include a large number of letter strings. In addition, the content may also include image data. When the content is displayed on a small display unit, a user must scroll through several screens in order to see all of the content. This operation is cumbersome, and moreover, it is difficult to view the information. The present specification discloses technology that can eliminate these types of inconveniences.

One type of technology disclosed in the present specification is a communication device. The communication device may be connected with an information display device in a communicable manner. The aforementioned term "information display device" is a concept including any unit that can display information. Examples of the information display device include a PC (Personal Computer), a television, etc. The communication device may comprise an address information storage unit, a summarized information acquisition unit, a title display unit, a title selecting unit, and a sending unit. Each of these units will be described in detail below.

The address information storage unit may be configured to store address information of summarized content information. The summarized content information may include, for each of a plurality of contents, at least address information of the content and a title of the content. The aforementioned term "address information" is a concept including any information that can specify the address of a content. One example of address information is a URL (Uniform Resource Locator), etc. In addition, the aforementioned term "title" may be a letter string that is smaller than the letter string of an entire content, and mean a letter string that reflects the details of the content. The summarized information acquisition unit may be configured to acquire the summarized content information from the address information stored in the address information storage unit. The title display unit may be configured to display the titles of the plurality of contents included in the summarized content information acquired by the summarized information acquisition unit. The title selecting unit may be configured to allow a user to select at least one title from the titles of the plurality of contents displayed on the title display unit. The sending unit may be configured to send information concerning a content corresponding to the selected title.

The aforementioned technology is effective in situations in which a display unit of the information display device is larger than a display unit of the communication device. The information concerning a content corresponding to the selected title (for example, the address information of the content, entire the content, etc.) may be sent from the communication device to the information display device in situations in which it is difficult to view the entire content on the display device of the communication device. A user can view the entire content on the display unit of the information display device. Note that the communication device may be capable of displaying a content acquired from the address information of the content, or may not be capable thereof. In the later case, the communication device may be a configuration that does not include a browser. In this case, the construction of the communication device can be simplified.

BRIEF DESCRIPTION OF THE DRAWINGS

FIG. 5 shows an example of the storage details of a running PC information storage area.

DETAILED DESCRIPTION OF THE PREFERRED EMBODIMENT

First Embodiment

Figure 1:
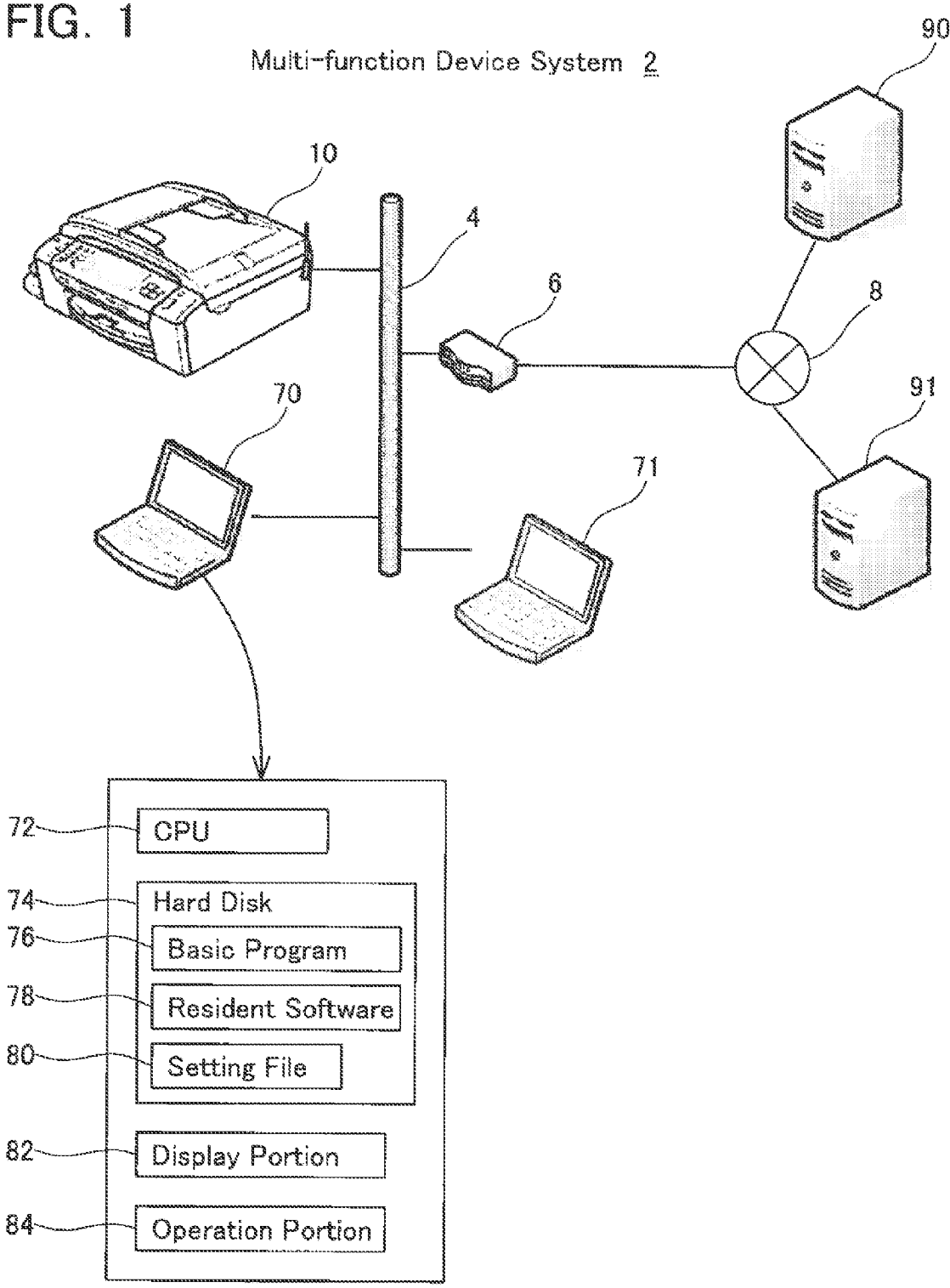
FIG. 1 shows the configuration of a multi-function device system.

An embodiment will be described with reference to the drawings. FIG. 1 shows an overall view of a multi-function device system 2 of the present embodiment. The multi-function device system 2 comprises a multi-function device 10, a plurality of PCs 70, 71, and a plurality of content servers 90, 91. Note that in FIG. 1, only one multi-function device 10, two PCs 70, 71, and two content servers 90, 91 are shown, but the exact number of these can be changed as desired. The multi-function device 10 is connected to a LAN line 4. Each PC 70, 71 is connected to the LAN line 4. The LAN line 4 is connected to the Internet 8 via a router 6. Each content server 90, 91 is connected to the Internet 8. In the present embodiment, the content server 90 publishes one site, and the content server 91 publishes one site. Each site includes a plurality of contents. Furthermore, each content server (for example 90) stores feed information (RSS type feed information) which is summarized information of the plurality of contents that the content server (for example 90) includes.

(Configuration of the PC)

FIG. 1 shows the configuration of PC 70. The PC 71 has the same configuration as the PC 70. The PC 70 has a CPU 72, a hard disk 74, a display portion 82, an operation portion 84, etc. Note that although not shown in FIG. 1, PC 70 has a network interface that is connected to the LAN line 4.

The CPU 72 will execute various processes in accordance with programs 76, 78 stored on the hard disk 74. The processes executed by the CPU 72 will be described below in greater detail. The hard disk 74 stores various programs 76, 78. A basic program 76 is a program for controlling the basic operation of the PC 70. The basic program 76 includes, for example, a browser for downloading and displaying an item of content from a site on the Internet 8. A resident software 78 is a program for such things as sending PC running notifications to the multi-function device 10, and operating the PC in accordance with commands from the multi-function device 10. The PC running notification will be described in detail below. The resident software 78 is, for example, installed on the PC 70 from a computer readable media. In addition, the resident software 78 may, for example, be downloaded from a site on the Internet 8 and installed on the PC 70. The hard disk 74 stores a setting file 80. The setting file 80 includes the IP address of the multi-function device 10. The stored details of the setting file 80 are set, for example, by a user. How the stored details of the setting file 80 are to be used will be described in detail below.

The display portion 82 can display various information. The display portion 82 has a comparatively large display screen. The display portion 82 has a display screen that is larger than a display panel 50 (see FIG. 2) on the multi-function device 10. The operation portion 84 is constructed from a keyboard and mouse. A user can input various commands and information into the PC 70 by operating the operation portion 84.

(Configuration of the Multi-Function Device)

Figure 2:
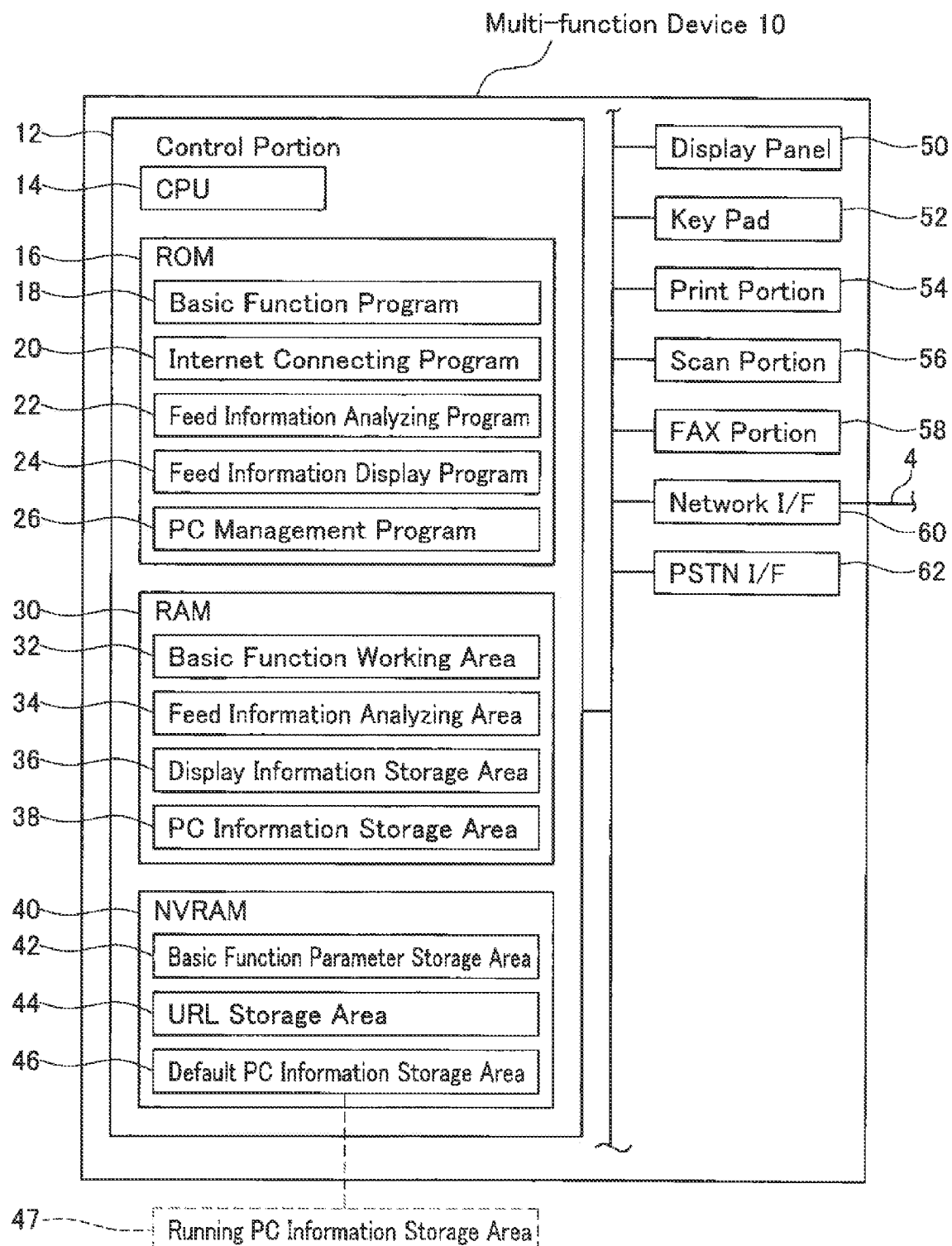
FIG. 2 shows the configuration of a multi-function device.

FIG. 2 shows the configuration of the multi-function device 10. The multi-function device 10 has a control portion 12, a display panel 50, a key pad 52, a print portion 54, a scan portion 56, a fax portion 58, a network interface 60, a PSTN interface 62, etc. The control portion 12 has a CPU 14, ROM 16, RAM 30, NVRAM 40 etc.

The CPU 14 will execute various processes in accordance with programs 18 to 26 stored in ROM 16. The processes executed by the CPU 14 will be described below in greater detail. ROM 16 stores various programs 18 to 26. A basic function program 18 is a program for controlling the basic operation of the multi-function device 10. The basic function program 18 includes, for example, a program for generating display data to be displayed on the display panel 50. In addition, the basic function program 18 includes, for example, a program for controlling the print portion 54, the scan portion 56, the fax portion 58, etc. An internet connecting program 20 is a program for connecting to the Internet 8. A feed information analyzing program 22 is a program for analyzing feed information acquired from the content servers 90, 91, and generating information for display on the display panel 50 (hereinafter referred to as display information). A feed information display program 24 is a program for displaying display information. A PC management program 26 is a program for executing processes in accordance with a PC running notification sent from the PCs 70, 71. More specifically, the PC management program 26 is a program for storing information (e.g., an IP address or PC host name) related to a PC that is a sender of a PC running notification in a PC information storage area 38 of the RAM 30 described below.

RAM 30 has various storage areas 32 to 38. A basic function working area 32 is a storage area for storing various types of data generated during the execution of processes in accordance with the basic function program 18. A feed information analyzing area 34 is a storage area for storing various types of data generated during the execution of processes in accordance with the feed information analyzing program 22. A display information storage area 36 is a storage area for storing the display information generated in accordance with the feed information analyzing program 22. A PC information storage area 38 is a storage area for storing information related to a PC that sends a PC running notification.

NVRAM 40 has various storage areas 42 to 47. A basic function parameter storage area 42 is a storage area for storing various parameters (e.g., print settings, scan settings, etc.) used when the CPU 14 executes processes in accordance with the basic function program 18. A URL storage area 44 is a storage area for storing URLs for feed information in each content server 90, 91. For example, a user must register in order to receive content from each content server 90, 91. This registration may be performed by using the multi-function device 10, or may be performed by using the PCs 70, 71. For example, if a user has used the PC 70 to register in order to receive content from the content server 90, the URL of the feed information in the content server 90 will be sent from the PC 70 to the multi-function device 10. In this way, the URL of the feed information in the content server 90 will be stored in the URL storage area 44. A default PC information storage area 46 stores information for identifying the IP address of a PC or the host name of a PC etc. The user can input the IP address of a desired PC (e.g., PC 70) into the multi-function device 10. The default PC information storage area 46 stores the IP address and host name input by the user. A running PC information storage area 47 will be described in detail below in the second embodiment.

The display portion 50 can display various information. The display screen of the display panel 50 is smaller than the display screen of the PCs 70, 71. The display panel 50 functions as a touch panel. The key pad 52 includes a plurality of keys. A user can input various commands and information into the multi-function device 10 by operating the key pad 52. The print portion 54 has a print mechanism such as ink jet type, laser type, etc. The scan portion 56 has a reading mechanism such as CCD, CIS, etc. The fax portion 58 performs various operations in order to perform fax communications.

The network interface 60 is connected to the LAN line 4. The multi-function device 10 can communicate with the PCs 70, 71 and access the Internet 8. The PSTN interface 62 is connected to a PSTN (Public Switched Telephone Network) not illustrated in the drawings. The PSTN is used when performing fax or telephone communications.

(Storage Details of the URL Storage Area)

Figure 3:
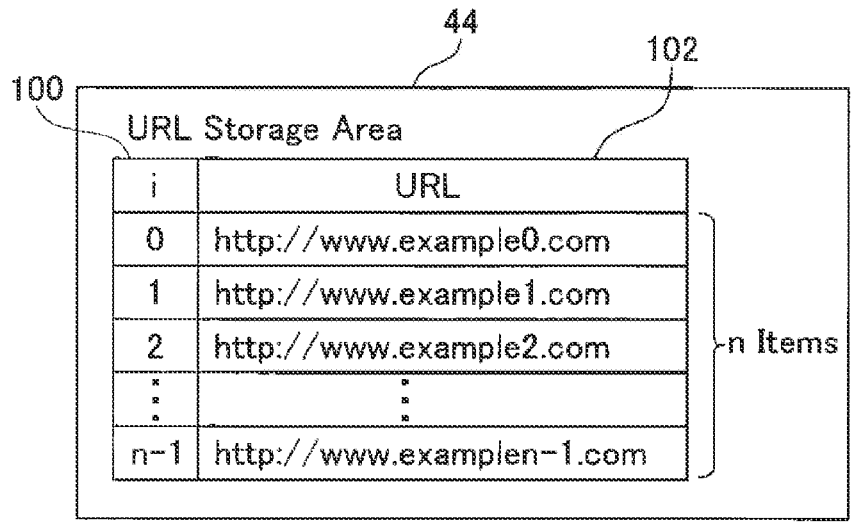
FIG. 3 shows an example of the storage details of a URL storage area.

Next, the storage details of the URL storage area 44 of the NVRAM 40 (see FIG. 2) will be explained. FIG. 3 shows an example of the storage details of the URL storage area 44. The URL storage area 44 can store URLs 102 of feed information in each content server 90, 91. In other words, the URL storage area 44 can store URLs 102 of feed information for each site. In the example of FIG. 3, n items of URL 102 are stored. An identification number 100 is assigned to each URL 102. In the present embodiment, the identification number 100 is represented with the symbol "i".

(Storage Details of the Display Information Storage Area)

Figure 4:
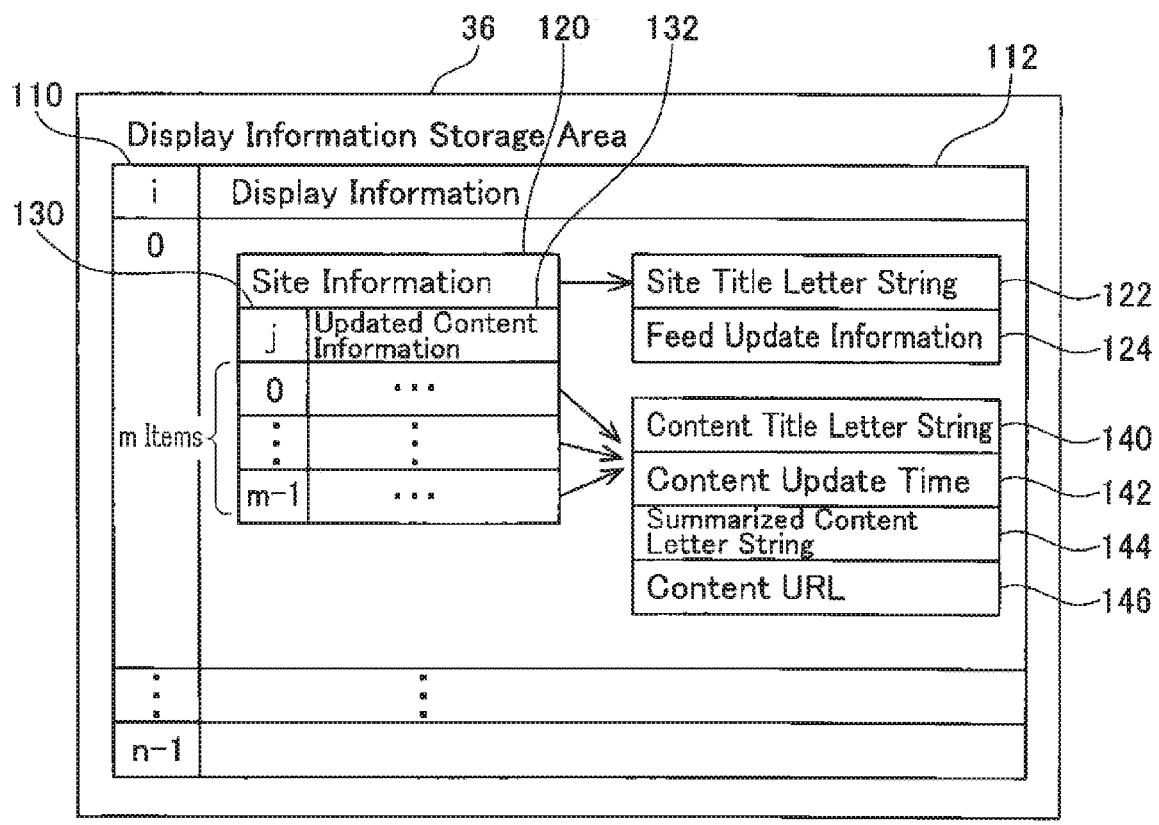
FIG. 4 shows an example of the storage details of a display information storage area.

Next, the storage details of the display information storage area 36 of the RAM 30 (see FIG. 2) will be explained. FIG. 4 shows an example of the storage details of the display information storage area 36. The display information storage area 36 can store display information 112 for each URL stored in the URL storage area 44. In other words, the display information storage area 36 can store display information 112 for each site stored in the URL storage area 44. As noted above, n items of URL 102 (n is an integer equal to 1 or more) are stored in the URL storage area 44 (see FIG. 3). Because of this, n items of display information 112 are stored in the display information storage area 36. An identification number 110 is assigned to each item of display information 112. In the present embodiment, the identification number 110 is represented with the symbol "i".

The data structure of each individual item of display information 112 will be explained. The display information 112 includes site information 120. The site information 120 includes a site title letter string 122 and feed update information 124. The site title letter string 122 is a letter string of the title of a site. This title can also be restated as "the name of a site". Feed update information 124 is information relating to the time at which the feed information in a content server was updated (the latest update).

The display information 112 includes updated content information 132. The number of updated content information 132 is equal to the number of contents in a site. For example, in FIG. 4, the display information 112 corresponding to "i=0" has m items of updated content information 132 (m is an integer equal to 1 or more). This means that the site corresponding to "i=0" has m items of content. For example, if there is a content related to a weather forecast and a content related to sports in a predetermined site, the display information 112 related to that site will have two updated content information 132. An identification number 130 is assigned to each updated content information 132. In the present embodiment, the identification number 130 is represented with the symbol "j".

Each updated content information 132 includes a content title letter string 140, content update time 142, a summarized content letter string 144, and a content URL 146. In the aforementioned example, the updated content information 132 corresponding to the item of content related to a weather forecast includes information 140 to 146, and the updated content information 132 corresponding to the content related to sports also includes the information 140 to 146. The content title letter string 140 is a letter string of the title of a content. This title can also be restated as "the name of content". The content update time 142 is information relating to a time at which the content in a content server was updated (the latest update). The summarized content letter string 144 is a letter string in a content that has been summarized. In other words, the summarized content letter string 144 is a letter string that is larger than the title of the content, a letter string that is smaller than the entire letter string of the content, and a letter string that reflects the details of the content. The content URL 146 is the URL of the item of content.

(Process Executed by the PC)

Figure 6:
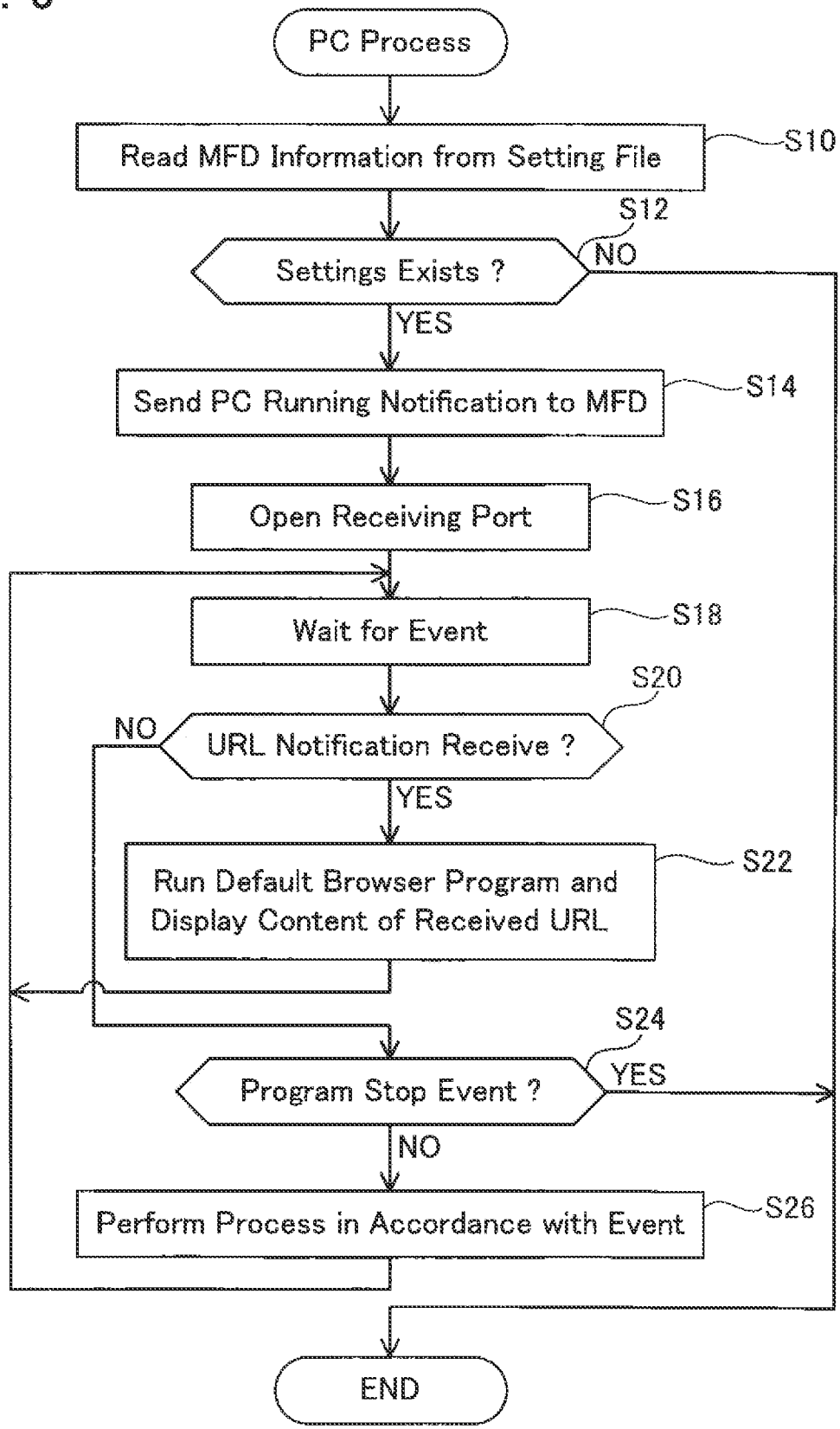
FIG. 6 shows a flowchart of a process executed by a PC.

Next, the process executed by PC 70 will be described. The process executed by PC 71 is identical. The OS will run when the PC 70 is run (Power ON), and the resident software 78 (see FIG. 1) will thereafter be automatically run by the OS. The CPU 72 of the PC 70 will execute a process in accordance with the resident software 78. FIG. 6 shows a flowchart of the process executed by the CPU 72 of the PC 70.

The CPU 72 will read in the storage details of the setting file 80 (see FIG. 1) (S10). The CPU 72 will determine whether information is stored in the setting file 80 (S12). In the present embodiment, the IP address of the multi-function device 10 is stored in the setting file 80 (preferably information that can identify the multi-function device 10, however the information can be a node name etc. and is not limited to an IP address). In this case, the CPU 72 will determine the answer in S12 is YES, and proceed to S14. In contrast, if information is not stored in the setting file 80, the process executed in accordance with the resident software 78 will be complete.

In S14, the CPU 72 will send a PC running notification to the multi-function device 10 (S14). The PC running notification includes the IP address and host name of the PC 70. Next, the CPU 72 will open a receiving port having a predetermined port number (S16). The CPU 72 will wait until an event occurs (S18). If an event occurs, the CPU 72 will proceed to S20. In S20, the CPU 72 will determine whether a URL notification has been received from the multi-function device 10. How the URL notification is sent from the multi-function device 10 will be described in detail below. In the event the answer is YES in S20, the CPU 72 will run the browser program, and access the received URL (S22). In this way, a content corresponding to the URL from the multi-function device 10 will be displayed by the display portion 82 (see FIG. 1). The user can then view the content.

In the event the answer in S20 is NO, the CPU 72 will determine whether a user has ordered the program of the resident software 78 to stop (S24). For example, the user can input the aforementioned command to the PC 70 by applying a predetermined operation to the operation portion 84. In this case, the CPU 72 will determine that the answer is YES in S24, and terminate the process. In contrast, in the event the answer is NO in S24, the CPU 72 will execute a process in accordance with the event (S26), and will stand by until the next event occurs (S18).

(Process Executed by the Multi-Function Device)

Next, the process executed by the multi-function device 10 will be explained. Although not shown in the flowchart, the CPU 14 of the multi-function device 10 will execute the following process in accordance with the PC management program 26 (see FIG. 2). As noted above, PCs 70, 71 send a PC running notification to the multi-function device 10 every time they run (see S14 of FIG. 6). The CPU 14 will monitor whether a PC running notification is received. When the CPU 14 receives a PC running notification, the IP address and host name included in that PC running notification will be stored in the PC information storage area 38 (see FIG. 2).

Note that the PCs 70, 71 may periodically send a PC running notification to the multi-function device 10 while they are running. In this case, when the PCs 70, 71 have stopped running (power OFF), a PC running notification will not be sent to the multi-function device 10. If the CPU 14 has not received a PC running notification from a PC having its IP address and host name stored in the PC information storage area 38 during a predetermined time period, the CPU 14 will delete that IP address and host name from the PC information storage area 38. In this way, only information related to a running PC will be stored in the PC information storage area 38.

In addition, the PCs 70, 71 need not periodically send a PC running notification to the multi-function device 10. In this case, the PCs 70, 71 may send a run stop notification to the multi-function device 10 (including an IP address and a host name) each time a PC has stopped running. Even in this variation, the CPU 14 can know whether the PCs 70, 71 have stopped running. The CPU 14 will delete the IP address and host name included in the run stop notification in the PC information storage area 38. Even in this variation, only information related to a running PC will be stored in the PC information storage area 38.

(Feed Information Analyzing Process)

Figure 7:
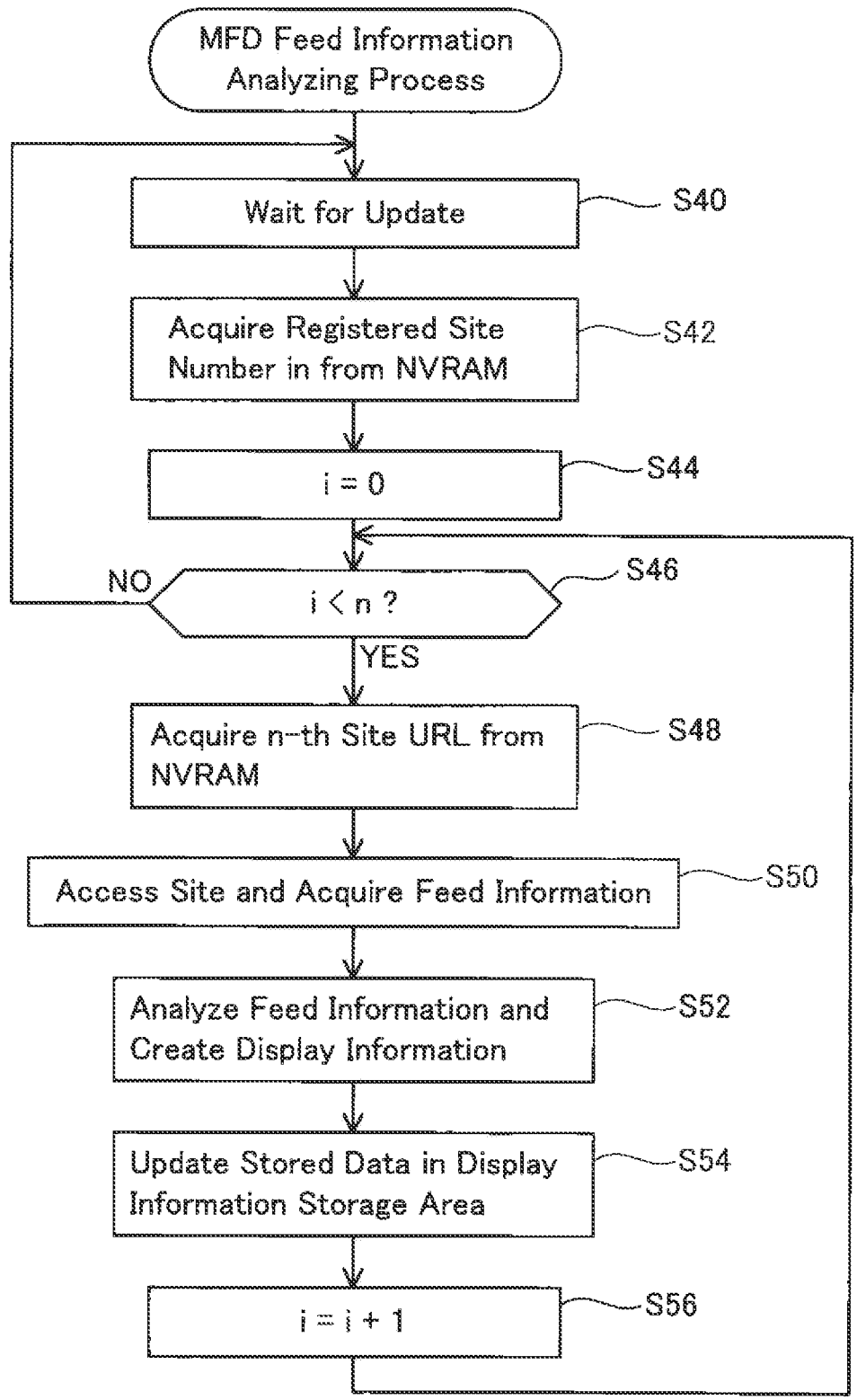
FIG. 7 shows a flowchart of a feed information analyzing process executed by the multi-function device.

Next, a feed information analyzing process for the CPU 14 of the multi-function device 10 to acquire and analyze feed information will be explained. The feed information analyzing process will run as an independent task, and is executed when the multi-function device 10 runs in accordance with the internet connecting program 20 and the feed information analyzing program 22 (see FIG. 2). FIG. 7 shows a flowchart of the feed information analyzing process.

The CPU 14 will wait until an update time has arrived (S40). The update time may, for example, be set by a user, or may be determined by a program. When the update time arrives, the CPU 14 will proceed to S42. In S42, the CPU 14 will acquire the number of URLs (number of sites) stored in the URL storage area 44 of the NVRAM (see FIG. 2). As shown in FIG. 3, in the present embodiment, n items of URL are stored in the URL storage area 44. Because of this, the CPU 14 will acquire "n" in S42. Next, the CPU 14 will initialize the counter i (S44). The CPU 14 will determine whether the counter i is smaller than n (S46). In the event that the answer is YES here, the CPU 14 will proceed to S48.

In S48, the CPU 14 will acquire the URL of the i-th site from the URL storage area 44. For example, if the URL of the 0-th site is to be acquired, in the example of FIG. 3, http://www.example0.com will be acquired. Next, the CPU 14 will, in accordance with the internet connecting program 20, access the URL acquired in S48 and acquire feed information (S50). The feed information includes the site information 120 and updated content information 132 shown in FIG. 4. The CPU 14 will generate the display information 112 shown in FIG. 4 by analyzing the feed information (S52). The CPU 14 will store the display information 112 generated in S52 in the display information storage area 36 (S54). For example, when display information 112 is generated for the 0-th site, the CPU 14 will clear the old display information 112 associated with the number "i=0", and store new display information 112 associated with the number "i=0". Next, the CPU 14 will add 1 to the counter i (S56) and return to S46. By executing the process of FIG. 7, the latest feed information for each site will be stored in the display information storage area 36.

(Display Process)

Figure 8:
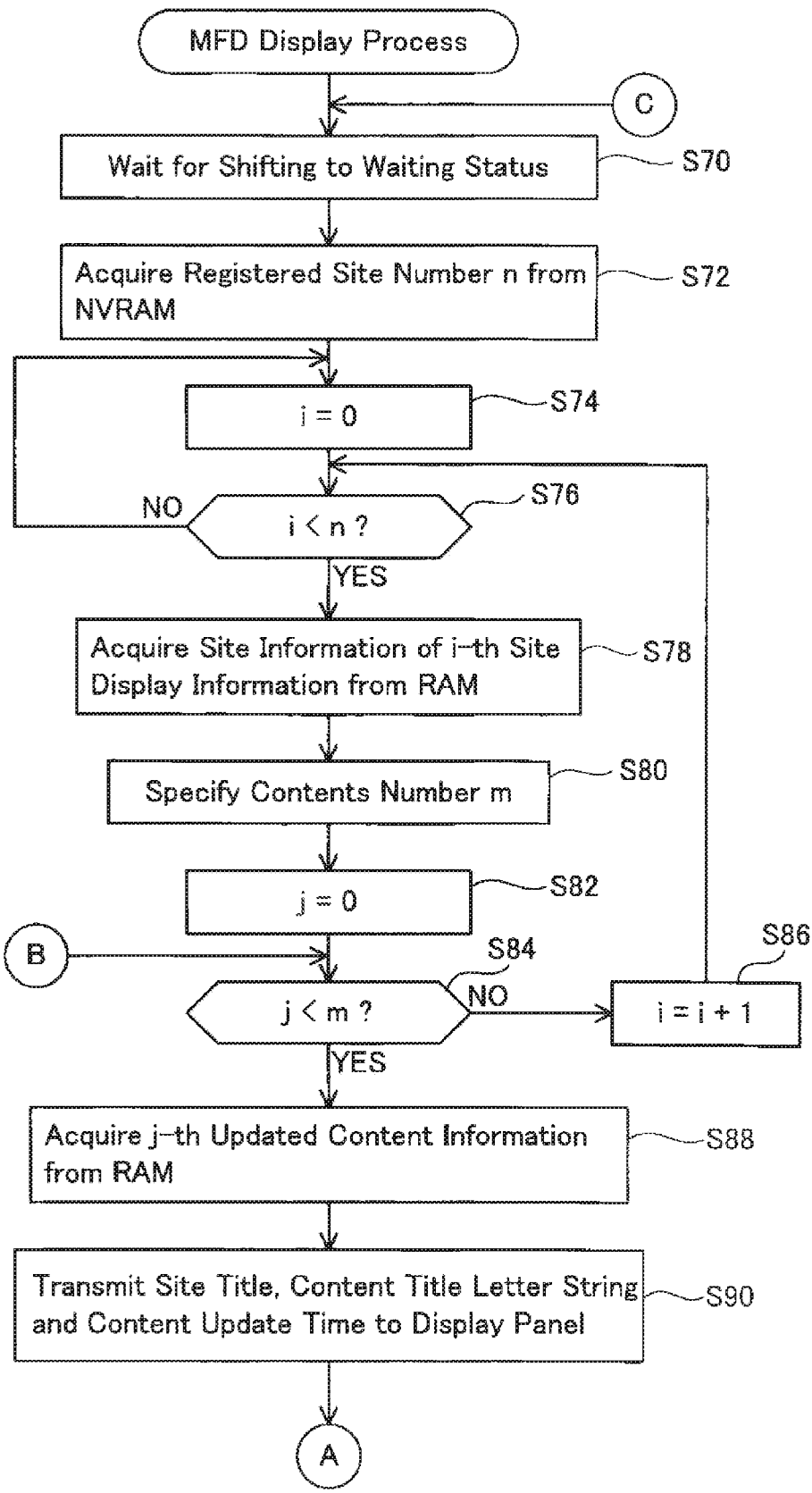
FIG. 8 shows a flowchart of a display process executed by the multi-function device.

Next, a display process for the CPU 14 of the multi-function device 10 to display the feed information will be explained. The display process will run as an independent task, and is executed when the multi-function device 10 runs in accordance with the feed information display program 24 (see FIG. 2). FIG. 8 shows a flowchart of the display process.

Figure 13:
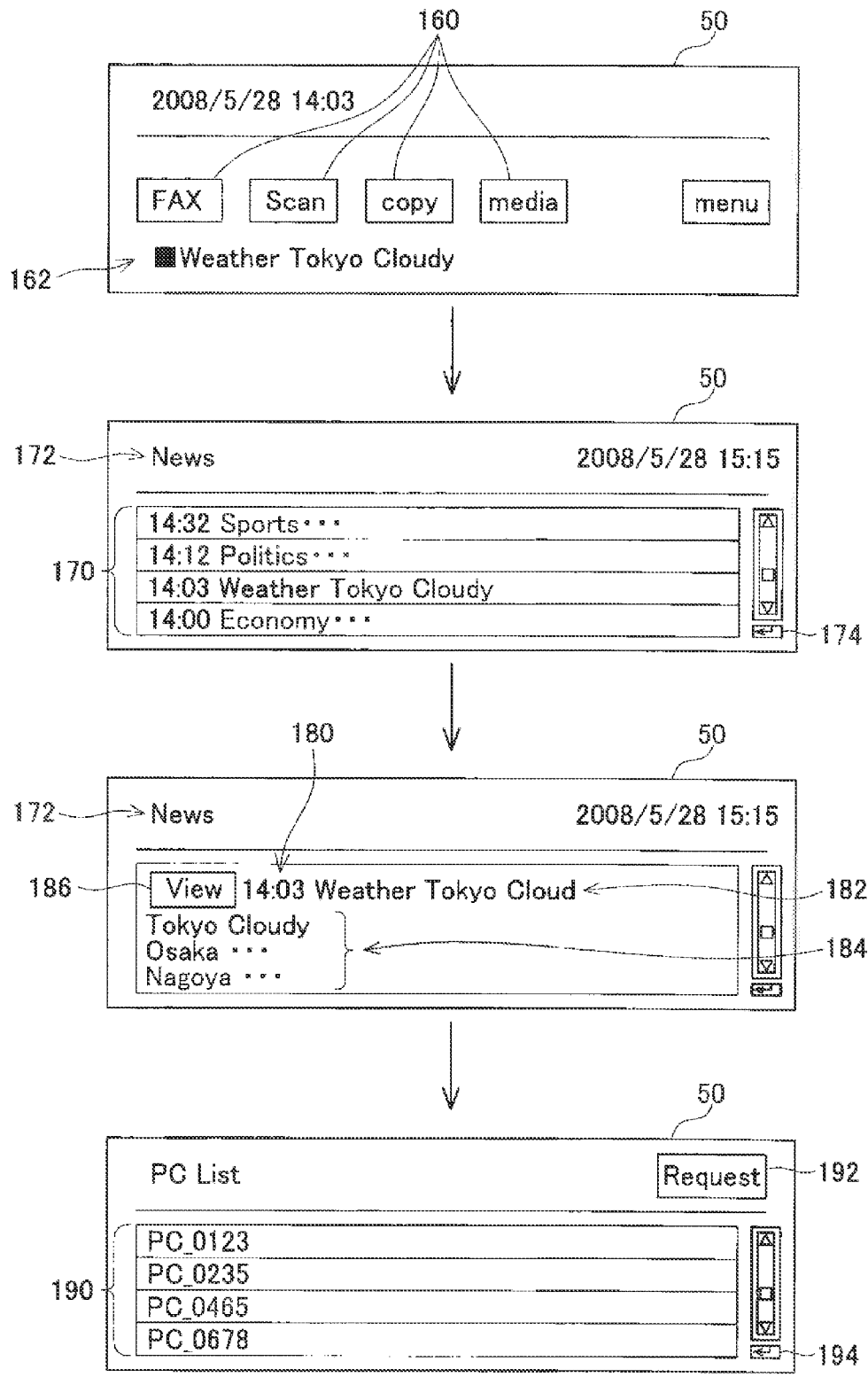
FIG. 13 shows how an item displayed on the display panel will change.

The multi-function device 10 has a plurality of states, such as a power saving state, a waiting state, a function execution state, etc. In the power saving state, nothing will be displayed on the display panel 50 (the display panel 50 is turned off). When an operation for instructing a process is performed on the key pad 52 during the power saving state, the multi-function device 10 will shift to the waiting state. In the waiting state, information for selecting a function will be displayed on the display panel 50 (the display panel 50 is turned on). The uppermost illustration shown in FIG. 13 shows an example of the display panel 50 in which a button 160 for selecting a function is displayed. A user can input a function execution command into the multi-function device 10 by operating the button 160. In this case, the multi-function device 10 will shift to the function execution state. In the function execution state, information relating to the function being executed will be displayed on the display panel 50 (e.g. the number of copies, etc.). Note that a function execution command can also be input into the multi-function device 10 during the power saving state. For example, a print command from the PCs 70, 71 can be input into the multi-function device 10 in the power saving state. In this case as well, the multi-function device 10 will shift to the function execution state.

When the function being executed in the multi-function device 10 is completed, the multi-function device 10 will shift to the waiting state (but may instead shift to the power saving state). In addition, if an event has not occurred in a predetermined time period during the waiting state (operation of the display panel 50 or key pad 52, a print command from the PCs 70, 71, etc.), the multi-function device 10 will shift to the power saving state.

The CPU 14 will wait until the multi-function device 10 has shifted from the power saving state or the function execution state to the waiting state (S70). When the multi-function device 10 shifts to the waiting state, the CPU 14 will proceed to S72. In S72, the CPU 14 will acquire the URL number (site number) stored in the URL storage area 44 (see FIG. 2) of the NVRAM (S72). This process is identical to the process of S42 in FIG. 7. In the present embodiment, the CPU 14 will acquire "n" in S72. Next, the CPU 14 will initialize the counter i (S74). The CPU 14 will determine whether the counter i is smaller than n (S76). In the event that the answer is YES here, the CPU 14 will proceed to S78.

In S78, the CPU 14 will acquire the site information included in the display information for the i-th site from the display information storage area 36 of the RAM 30. For example, with the 0-th site, in the example of FIG. 4, the site information 120 will be acquired (the site title letter string 122 and the feed update information 124). Next, the CPU 14 will specify the content number of the i-th site (S80). For example, with the 0-th site, in the example of FIG. 4, there are m items of content. In this case, the CPU 14 will specify "m" in S80. Next, the CPU 14 will initialize the counter j (S82). The CPU 14 will determine whether the counter j is smaller than m (S84). In the event that the answer is YES here, the CPU 14 will proceed to S88.

In S88, the CPU 14 will acquire the j-th updated content information for the i-th site from the display information storage area 36 of the RAM 30. In this way, a content title letter string 140, content update time 142, a summarized content letter string 144, and a content URL 146 for one item of content will be acquired. Next, the CPU 14 will send the site title letter string 122 acquired in S78, the content title letter string 140 acquired in S88, and the content update time 142 acquired in S88 to the display panel 50 (S90). As a result, as shown in the uppermost illustration of FIG. 13, the content title letter string 162 will be displayed on the display panel 50. Note that the content title letter string 162 will move (e.g., move from right to left). In other words, the content title letter string 162 will be displayed in a scrolling manner. Note that the site title letter string 122 and the content update time 142 may be displayed on the display panel 50, or may not be displayed thereon. The CPU 14 will proceed to S100 of FIG. 8 when S90 is completed.

In S100, the CPU 14 will wait until an event occurs. If an event occurs, the CPU 14 will proceed to S102. In S102, the CPU 14 will determine whether the scrolling (telop) display of one content title letter string 162 has ended. In the event the answer is YES here, the CPU 14 will add 1 to the counter j (S104), and proceed to S84 of FIG. 8. If it is determined in S84 that the counter j is smaller than m, the CPU 14 will execute S88 and S90 again. In this way, the content title letter string 162 will be displayed as a scrolling display based upon the next updated content information (e.g., the 1st updated content information). When the content title letter string 162 is displayed as a scrolling display based upon the entire updated content information of one site, the answer will be determined to be NO in S84. In this case, the CPU 14 will add 1 to the counter i (S86), and the processes of S78 to S90 will be executed with respect to the next site (e.g., the 1st site). In this way, the content title letter string 162 will be displayed as a scrolling display based upon the updated content information of the next site.

Figure 9:
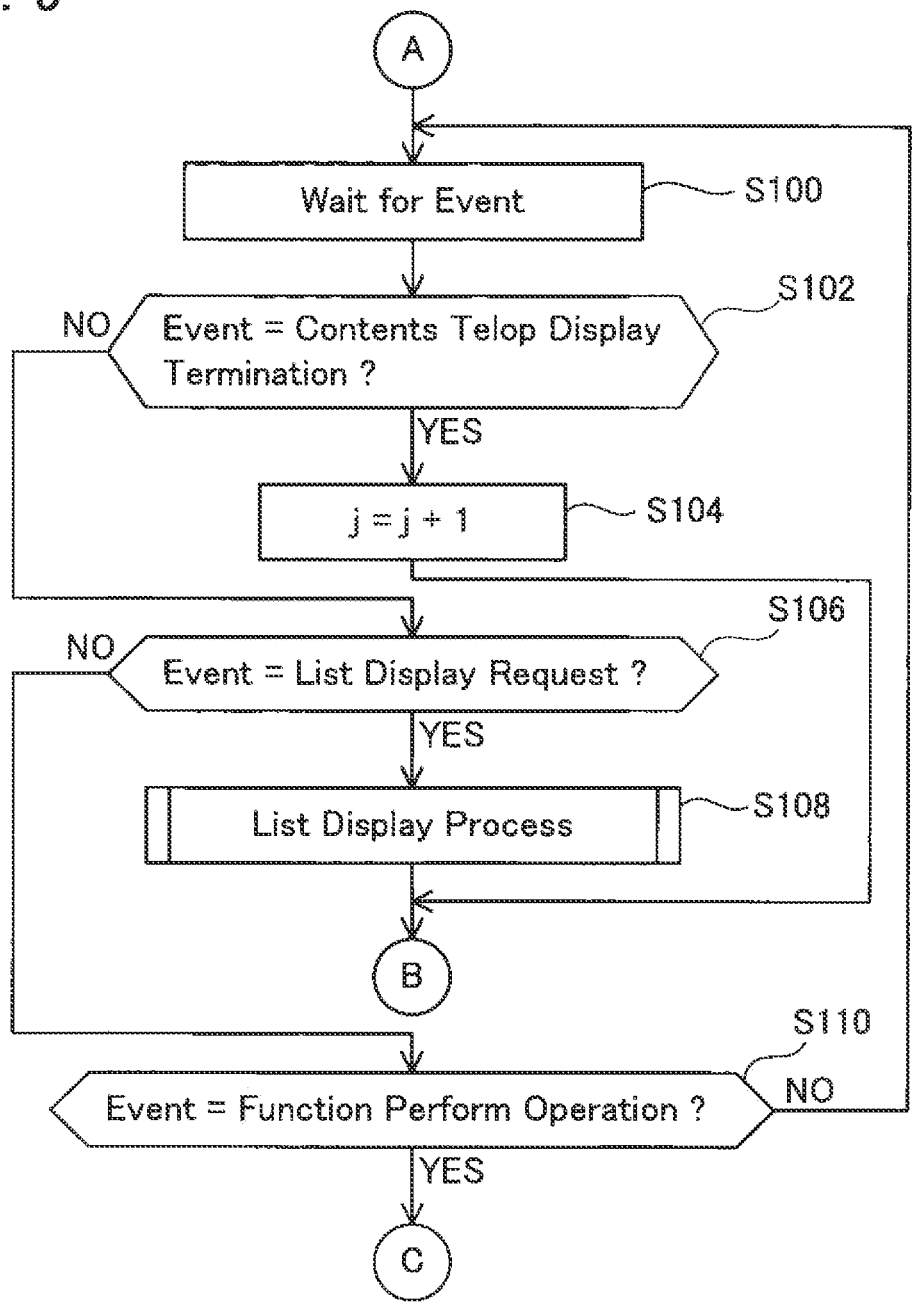
FIG. 9 shows the continuation of the flowchart of FIG. 8.

In the event the answer is NO in S102 of FIG. 9, the CPU 14 will determine whether a list display request event has been generated (S106). As shown in the uppermost illustration in FIG. 13, when the content title letter string 162 is displayed as a scrolling display, a user can touch the content title letter string 162. When a user touches the content title letter string 162, the CPU 14 will determine that the answer is YES in S106. In the event the answer is YES in S106, the CPU 14 will execute the list display process (S108). The details of the list display process will be described in detail below.

In the event the answer is NO in S106, the CPU 14 will determine whether a function execution operation has been generated (S110). A user can operate any of the buttons 160 shown in the uppermost illustration of FIG. 13. In this case, the CPU 14 will determine that the answer is YES in S110. The CPU 104 will execute a process corresponding to the button 160 that was operated (e.g., a fax communication process, a scan process, a copy process, etc.). In this case, the multi-function device 10 will shift to the function execution state, and information relating to the function being executed will be displayed on the display panel 50. The CPU 14 will return to S70 of FIG. 8, and will stand by until the multi-function device 10 has shifted to the waiting state. In contrast, in the event that the answer is NO in S110, the CPU 14 will execute a process in accordance with the event, return to S100, and will wait until the next event occurs.

(List Display Process)

Figure 10:
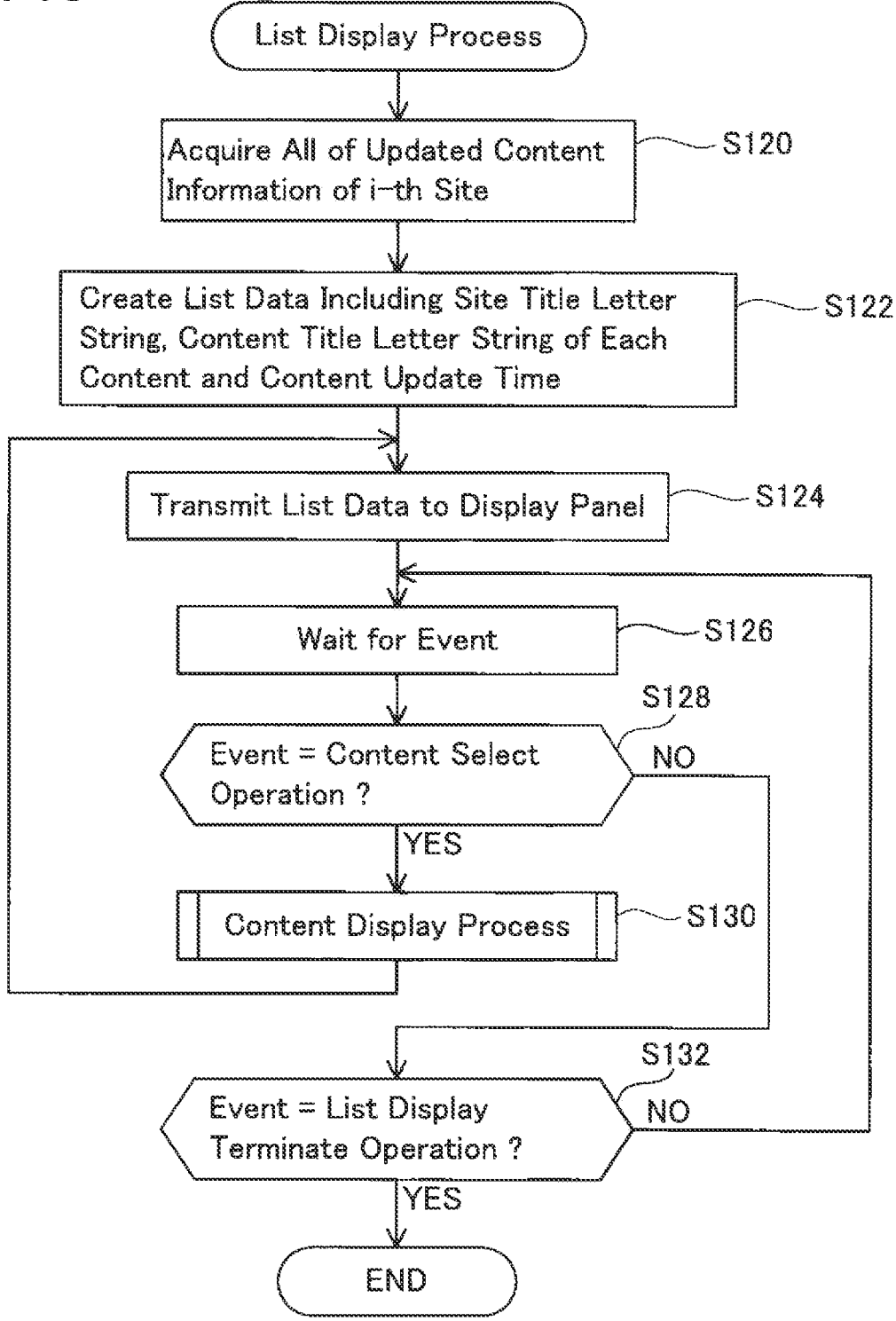
FIG. 10 shows a flowchart of a list display process executed by the multi-function device in a first embodiment.

Next, the list display process executed in S108 of FIG. 9 will be explained. FIG. 10 shows a flowchart of the list display process. The CPU 14 will acquire all the updated content information 132 in the i-th site (the site displayed by the content letter string 162) from the display information storage area 36 of RAM 30 (S120). For example, with the 0-th site, in the example of FIG. 4, there are m number of updated content information 132. In this case, m number of updated content information 132 will be acquired in S120. Next, the CPU 14 will create list data that includes the site title letter string 122 acquired in S78, the content title letter string 140 acquired in S120, and each content update time 142 acquired in S120 (S122). The CPU 14 will send the list data created in S122 to the display panel 50 (S124). As a result, as shown in the second illustration from the top of FIG. 13, the list 170 will be displayed on the display panel 50. The list 170 includes, for each of the plurality of contents (e.g. m number of items of content), content update time for that content and the content title letter string for that content. In the illustration second from the top in FIG. 13, with regard to a content relating to sports, content update time "14:32" and a content title letter string "Sports . . . " are displayed. In addition, in this example, a site title letter string 172 is also displayed. The CPU 14 will proceed to S126 when S124 is completed.

In S126, the CPU 14 will wait until an event occurs. If an event occurs, the CPU 14 will proceed to S128. In S128, the CPU 14 will determine whether an event related to a content selection operation has occurred. As shown in the second illustration from the top in FIG. 13, when the list 170 is displayed, a user can touch one content (the content title letter string). When a user touches the content, the CPU 14 will determine that the answer is YES in S128. In the event the answer is YES in S128, the CPU 14 will execute a content display process (S130). The details of the content display process will be described in detail below.

In the event the answer is NO in S128 of FIG. 10, the CPU 14 will determine whether a command to end the list display has been input (S132). When the list 170 is displayed as shown in the second illustration from the top in FIG. 13, a user can touch the button 174. In this case, the CPU 14 will determine that the answer is YES in S132. In the event the answer is YES in S132, the CPU 14 will end the list display process, and will return to S84 of FIG. 8. In contrast, in the event the answer is NO in S132, the CPU 14 will execute a process in accordance with the event, return to S126, and will wait until an event occurs.

(Content Display Process)

Figure 11:
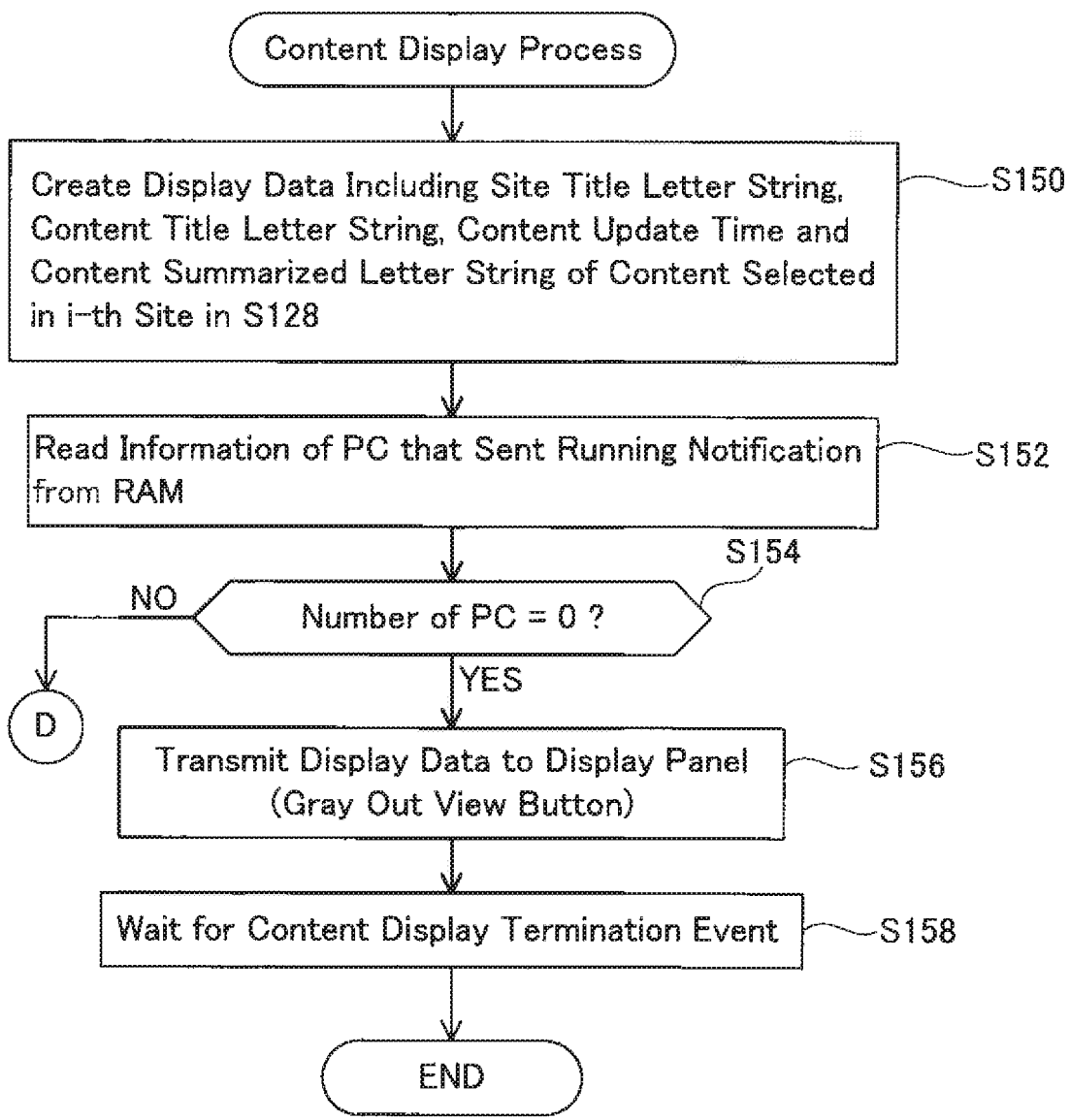
FIG. 11 shows a flowchart of a content display process executed by the multi-function device in the first embodiment.

Next, the content display process executed in S130 of FIG. 10 will be explained. FIG. 11 shows a flowchart of the content display process. The CPU 14 will create display data relating to the content selected in S128 of the i-th site from the display information storage area 36 of RAM 30 (S150). This display data includes the site title letter string 122, the content title letter string 140 for that content, the content update time 142 for that content, and the summarized content letter string 144 for that content. Next, the CPU 14 will read the storage details of the PC information storage area 38 (see FIG. 2) of RAM 30 (S152). The CPU 14 will determine whether information is stored in the PC information storage area 38 (S154). If information is not stored therein (i.e. if the number of running PCs is zero), the CPU 14 will determine that the answer in S154 is YES. In this case, the CPU 14 will proceed to S156.

Figure 14:
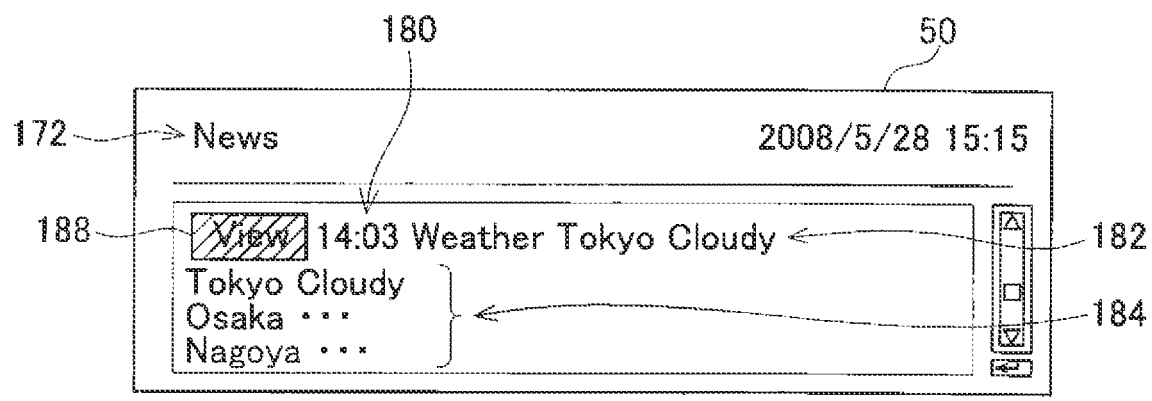
FIG. 14 shows an example of what is displayed on the display panel.

In S156, the CPU 14 will send the display data created in S150 to the display panel 50. As a result, the screen shown in FIG. 14 will be displayed on the display panel 50. The screen of FIG. 14 includes a site title letter string 172, content update time 180, a content title letter string 182, and summarized content letter strings 184. The screen of FIG. 14 further includes a view button 188. In the screen of FIG. 14, the view button 188 is grayed out (in FIG. 14, grayed out is represented by hatching). In S156 of FIG. 11, the CPU 14 will append attribute information to the display data that will cause the view button 188 to be grayed out, and that display data will be sent to the display panel 50. When a view button 186 that is not grayed out (see third illustration from top of FIG. 13) is operated by a user, the CPU 14 will execute the process after S176 in FIG. 12 described below. However, even if the grayed out view button 188 is operated by a user, the CPU 14 will not execute the process after S176. In other words, the grayed out view button 188 can be said to be inactivated (invalidated).

Note that nothing will be executed in the present embodiment even if the grayed out view button 188 is operated by a user, but a process that outputs a sound etc. may be executed. Next, the CPU 14 will wait until a content display termination event (the operation of the end button) is generated (S158).

If information is stored in the PC information storage area 38 (i.e. if a PC is running), the CPU 14 will determine that the answer in S154 is NO. In this case, the CPU 14 will proceed to S170 in FIG. 12. In S170, the CPU 14 will send the display data created in S150 to the display panel 50. As a result, the screen shown in the third illustration from the top of FIG. 13 will be displayed on the display panel 50. This screen includes items 172, 180, 182, 184 as in FIG. 14. This screen further includes a view button 186. The view button 186 is not grayed out, and is displayed in a normal manner. In S170 of FIG. 12, the CPU 14 will append attribute information to the display data that will cause the view button 186 to be displayed in a normal manner, and that display data will be sent to the display panel 50. The CPU 14 will proceed to S172 when S170 is completed.

In S172, the CPU 14 will wait until an event occurs. If an event occurs, the CPU 14 will proceed to S174. In S174, the CPU 14 will determine whether the view button 186 has been operated. In the event the answer here is NO, the CPU 14 will determine whether a content display termination event (the operation of the end button) has been generated (S175). In the event that the answer is YES here, the CPU 14 will terminate the content display process. In contrast, in the event the answer is NO in S175, the CPU 14 will execute a process in accordance with the event, and return to S172. In the event the answer is YES in S174, the CPU 14 will read the storage details of the default PC information storage area 46 (see FIG. 2) of NVRAM 40 (S176). The CPU 14 will determine whether information is stored in the default PC information storage area 46 (S178). In the event that the answer is YES here, the CPU 14 will proceed to S180. In contrast, in the event that the answer is NO in S178, the CPU 14 will proceed to S184.

In S180, the CPU 14 will determine whether the IP address and host name stored in the default PC information storage area 46 are stored in the PC information storage area 38 of the RAM 30. In other words, the CPU 14 will determine whether the PC stored in the default PC information storage area 46 is running. In the event that the answer is YES here, the CPU 14 will specify the content URL 146 (see FIG. 4) of the content selected in S128 of FIG. 10 (S182). Next, the CPU 14 will send the content URL 146 with the IP address stored in the default PC information storage area 46 as the destination. As a result, the PC (e.g. PC 70) that is the destination of the content URL 146 will determine that the answer is YES in S20 of FIG. 6, and access the content URL 146 and display the content. When S182 is completed, the content display process will be terminated.

In S184, the CPU 14 will create a list of information related to each PC stored in the PC information storage area 38 of the RAM 30. In the present embodiment, the CPU 14 will create a list of the host name for each PC stored in the PC information storage area 38. The CPU 14 will transmit the list to the display panel 50. As a result, the screen shown in the lowermost illustration of FIG. 13 will be displayed on the display panel 50. This screen includes a list 190 of host names. The CPU 14 will proceed to S186 when S184 is completed.

In S186, the CPU 14 will wait until an event occurs. If an event occurs, the CPU 14 will proceed to S188. In S188, the CPU 14 will determine whether a PC selection operation has been performed. When the screen shown in the illustration in the lowermost portion of FIG. 13 is displayed, a user can touch one PC (host name), and thereafter touch a request button 192. In this case, the CPU 14 will determine that the answer is YES in S188. In the event that the answer is YES in S188, the CPU 14 will specify the content URL 146 (see FIG. 4) of the content selected in S128 of FIG. 10 (S190). Next, the CPU 14 will send the content URL 146 with the IP address of the PC selected in S188 as the destination. As a result, the PC (e.g. PC 70) that is the destination of the content URL 146 will determine that the answer is YES in S20 of FIG. 6, and access the content URL 146 and display the content. When S190 is completed, the content display process will be terminated.

In the event the answer is NO in S188, the CPU 14 will determine whether a command to terminate the display has been input (S192). When the screen illustrated in the lowermost portion of FIG. 13 is displayed, a user can touch the button 194. In this case, the CPU 14 will determine that the answer is YES in S192. In the event that the answer is YES in SI 92, the content display process will be terminated. In contrast, in the event the answer is NO in S192, the CPU 14 will execute a process in accordance with the event, return to S186, and will wait until an event occurs.

The multi-function device system 2 of the present embodiment has been described in detail. Because the display panel 50 of the multi-function device 10 is small, displaying an entire item of content is difficult. The multi-function device 10 will, in S182 or S190 of FIG. 12, send the content URL 146 of the content selected by a user to a PC (e.g. PC 70). In this way, the content will be displayed on the display portion 82 of the PC 70. The display portion 82 of the PCs 70, 71 is larger than the display panel 50 of the multi-function device 10. A user can view the entire content on the large display portion 82. Because the entire content can be displayed on the PCs 70, 71, it will not be necessary to display the content on the multi-function device 10. Because of this, it will not be necessary to equip the multi-function device 10 with a browser program. In addition, in the present embodiment, the URL of the content will be sent to the PC 70 from the multi-function device 10, and the PC 70 will download the content. The multi-function device 10 can download the content, and compared to a configuration that sends downloaded content to the PC 70, can decrease the burden on the multi-function device 10 and the network 4.

In addition, in the aforementioned embodiment, the multi-function device 10 can send the content URL 146 to a running PC. This can prevent a phenomenon in which the content URL 146 is sent to a PC that is not running. A user can cause information related to the desired PC (e.g. the PC that he or she uses) to be stored in the default PC information storage area 46. If the PC stored in the default PC information storage area 46 is running, the multi-function device 10 will send the content URL 146 to that PC. In other words, the content URL 146 will be sent with priority to a PC determined in advance by a user. The task of repeatedly selecting the desired PC by a user can be omitted.

In the aforementioned embodiment, when the PC stored in the default PC information storage area 46 is not running (or when the PC is not stored in the default PC information storage area 46), the user can select the desired PC amongst those PCs that are running. The content URL 146 will be sent to a PC selected by a user. Note that even if only one PC is running, the list 190 shown in the lowermost illustration of FIG. 13 will be displayed. In order to send the content URL 146 to the running PC, a user must select that PC from the list 190 and touch the button 192. In other words, in the present embodiment, even if there is only one PC that is running, the content URL 146 will not be automatically sent to that PC.

This can prevent a phenomenon in which the content URL 146 is sent to a PC that is not desired by the user.

In addition, in the aforementioned embodiment, when there is a running PC present, the view button 186 having a normal display state will be displayed (see the third illustration from the top of FIG. 13), and when there is no running PC present, the grayed out view button 188 will be displayed (see FIG. 14). By changing the display state of the view buttons 186, 188 in response to the presence or absence of a running PC, a user can easily know whether a running PC is present.

Second Embodiment

Next, a second embodiment will be explained. Note that the configuration of the multi-function device system 2, the configuration of the plurality of PCs 70, 71, and the plurality of content servers 90, 91 are identical to the first embodiment.

In the second embodiment, the PC information storage area 38 and the default PC information storage area 46 (see FIG. 2) are not used. Instead of these storage areas, the running PC information storage area 47 will be used (see FIG. 2). The running PC information storage area 47 can store the host name of each of the plurality of PCs. The running PC information storage area 47 can also store an electronic mail address that is associated with a host name. A user can, for example, input the host name of a desired PC (e.g. PC 70) into the multi-function device 10 by operating the key pad 52. Furthermore, a user can, for example, input an electronic mail address that is to be associated with a host name into the multi-function device 10 by operating the key pad 52. The running PC information storage area 47 stores the host names and electronic mail addresses that were input by users.

(Storage Details of the PC Information Storage Area)

FIG. 5 shows an example of the storage details of the running PC information storage area 47. The running PC information storage area 47 can store a plurality of combined information 150 to 154. Each of the combined information 150 to 154 associate a host name 155 with a flag 156, and electronic mail addresses 157 to 159. The host name 155 and the electronic mail addresses 157 to 159 are input by users. One host name 155 can be associated with one electronic mail address (e.g. see combined information 152), or one host name 155 can be associated with a plurality of electronic mail addresses (e.g., see combined information 150). The host name 155 may not have an electronic mail address associated with it (e.g., see combined information 154). The flag 156 is a flag that shows whether a PC is running, and will show ON when a PC is running and show OFF when a PC is not running. Note that the host name of a PC may also be associated with the IP address of that PC. When the CPU 14 receives the PC running notification, the CPU 14 of the present embodiment changes the flag 156 associated with a host name included in the PC running notification from OFF to ON. Further, if the CPU 14 has not received a PC running notification from a PC having its host name stored in the running PC information storage area 47 during a predetermined time period, the CPU 14 changes the flag 156 associated with that host name from ON to OFF.

(Process Executed by the Multi-Function Device)

Figure 15:
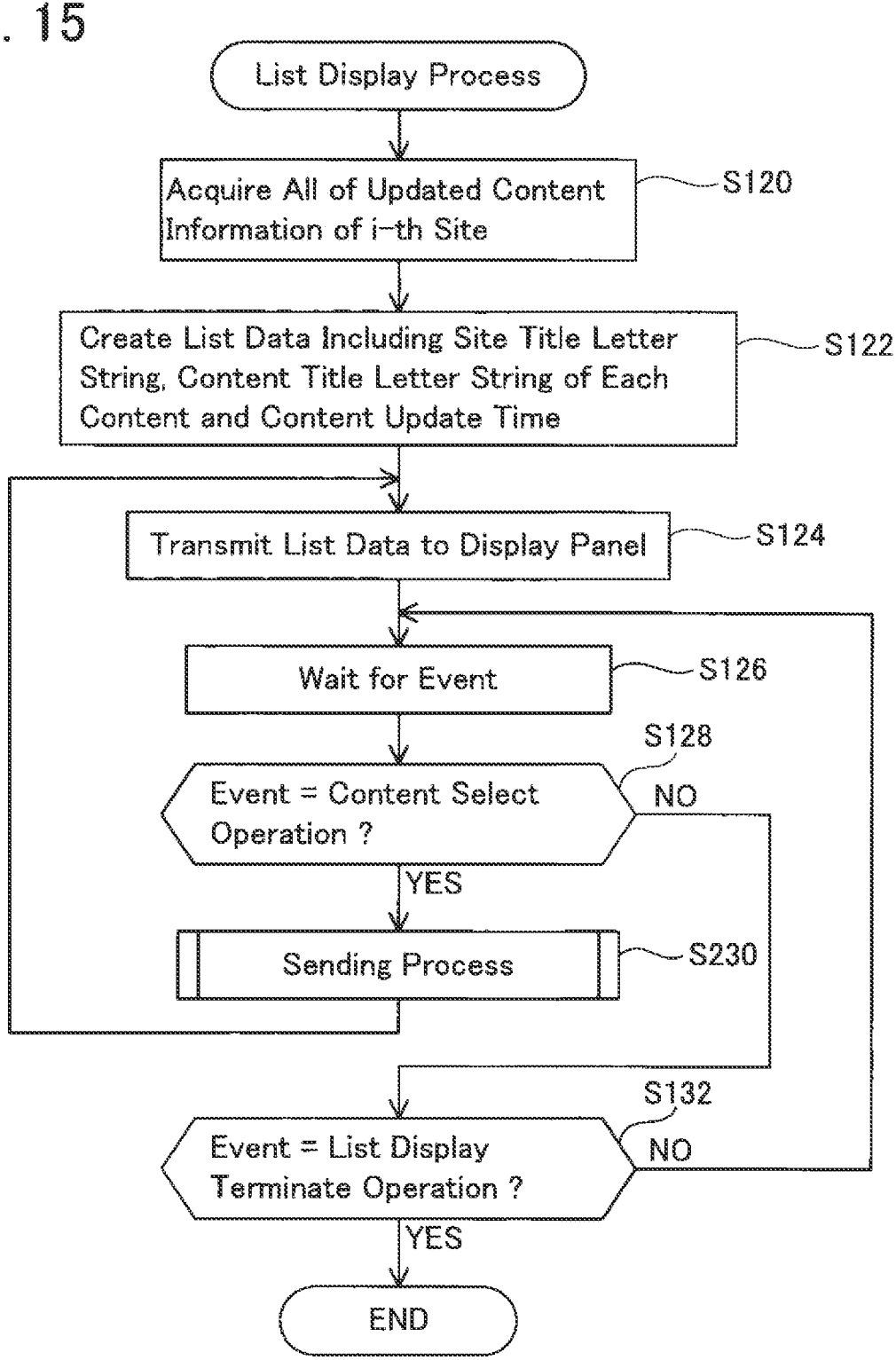
FIG. 15 shows a flowchart of the list display process executed by the multi-function device in a second embodiment.

In the first embodiment, in the event the answer is YES in S128 of FIG. 10, the CPU 14 executes the content display process (S130). In the present embodiment, as shown in FIG. 15, in the event the answer is YES in S128, the CPU 14 will execute a sending process (S230). Note that in the second embodiment, the processes executed by the CPU 72 of the PC 70 (see FIG. 6), the feed information analysis process (see FIG. 7), and the multi-function device display process (see FIGS. 8 and 9) are identical to those of the first embodiment, and thus an explanation will be omitted.

(Sending Process)

Figure 16:
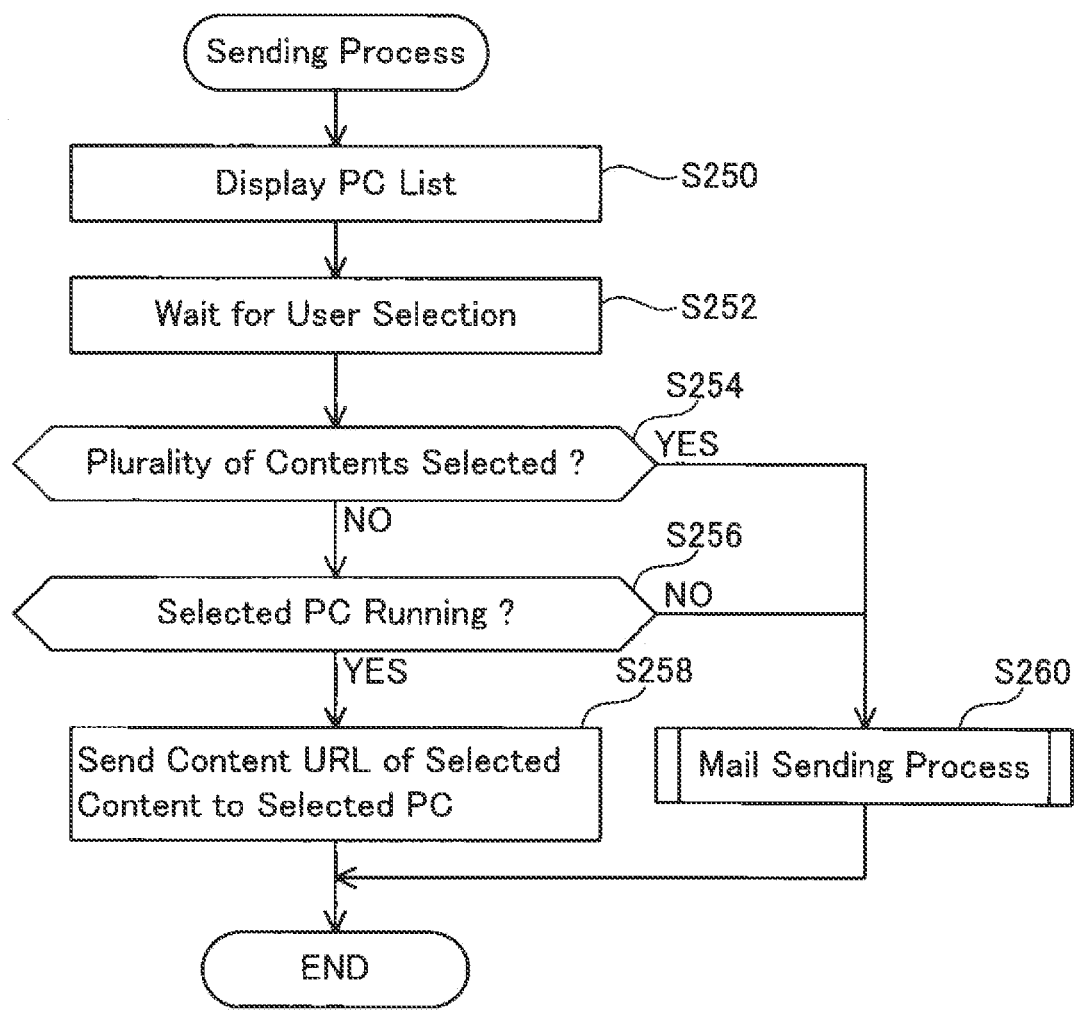
FIG. 16 shows a flowchart of a sending process executed by the multi-function device in a second embodiment.

FIG. 16 shows an example of a flowchart for the sending process. The CPU 14 will acquire all host names 155 (see FIG. 5) from the running PC information storage area 47 of the NVRAM 40, and display these on the display panel 50 (S250). A user can select at least one host name. The CPU 14 will wait until a host name is selected by a user (S252). If a host name is selected by a user, the CPU 14 will proceed to S254.

In the present embodiment, in S128 of FIG. 15, a user can select only one title in the screen of the second illustration from the top in FIG. 13, and also select a plurality of titles in that screen. In S254, the CPU 14 will determine whether a plurality of titles (items of content) have been selected in S128 of FIG. 15. In the event that the answer is YES here, the CPU 14 will execute a mail sending process (S260). The details of the mail sending process will be explained in detail below. In contrast, in the event the answer is NO in S254, the CPU 14 will determine, based upon the information stored in the running PC information storage area 47 of NVRAM 40, whether the PC corresponding to the host name selected by the user in S252 is running (S256). The CPU 14 will determine that the answer is YES in S256 when the flag 156 associated with the host name selected by the user in S252 is ON. The CPU 14 will determine the answer is NO in S256, and execute the mail sending process, when the flag 156 associated with the host name selected by the user in S252 is OFF (S260).

In the event the answer is YES in S256, the CPU 14 will specify the content URL 146 corresponding to the title (item of content) selected by the user in S128 of FIG. 15 by searching the display information storage area 36 of the RAM 30. Next, the CPU 14 will send the specified content URL 146 with the host name (or to the IP address) selected by the user in S252 as the destination. As a result, the PC (e.g. PC 70) will determine the answer is YES in S20 of FIG. 6, will download the item of content from the content URL 146 sent from the multi-function device 10, and display that content (see S22 of FIG. 5). In contrast, in the event the answer is NO in S256, the CPU 14 will execute the mail sending process (S260).

(Mail Sending Process)

Figure 17:
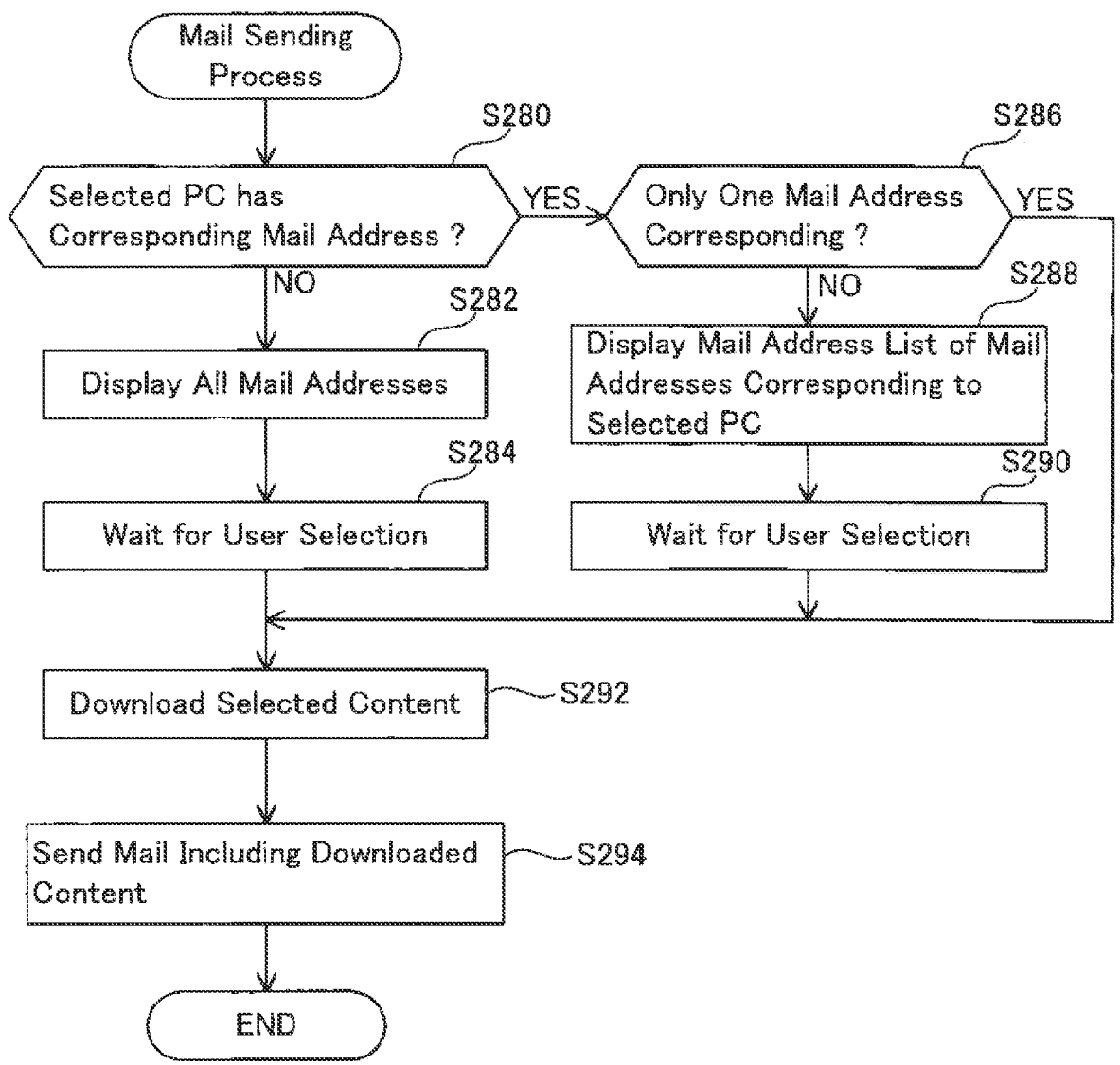
FIG. 17 shows a flowchart of a mail sending process executed by the multi-function device in a second embodiment.

Next, the mail sending process executed in S260 of FIG. 16 will be explained. FIG. 17 shows a flowchart of the mail sending process. The CPU 14 will determine whether one or more electronic mail addresses are associated with the host name selected by a user in S252 of FIG. 16, by searching the running PC information storage area 47 of the NVRAM 40 (S280). In the event the answer here is NO, the CPU 14 will display all electronic mail addresses stored in the running PC information storage area 47 on the display panel 50 (S282). In other words, the CPU 14 will display the electronic mail addresses associated with all host names on the display panel 50 other than the host name selected by the user in S252 in FIG. 16. The user can select at least one electronic mail address from the plurality of electronic mail addresses displayed on the display panel 50. The CPU 14 will wait until an electronic mail address is selected by a user (S284). If an electronic mail address is selected by a user, the CPU 14 will proceed to S292.

In the event the answer is YES in S280, the CPU 14 will determine whether only one electronic mail address is associated with the host name selected by a user in S252 in FIG. 16 (S286). In the event that the answer is YES here, the CPU 14 will proceed to S292. In contrast, in the event the answer is NO in S286, the CPU 14 will display all electronic mail addresses associated with the host name selected by a user in S252 of FIG. 16 on the display panel 50. The user can select at least one electronic mail address from the plurality of electronic mail addresses displayed on the display panel 50. The CPU 14 will wait until an electronic mail address is selected by a user (S290). If an electronic mail address is selected by a user, the CPU 14 will proceed to S292.

In S292, the CPU 14 specify the content URL 146 (see FIG. 4) corresponding to the title selected in S128 of FIG. 15. Next, the CPU 14 will access the specified content URL, and download the item of content. Note that if a plurality of titles have been selected in S128 of FIG. 15, the CPU 14 will specify the content URLs (see FIG. 4) corresponding to each of the plurality of these titles. In this case, the CPU 14 will download the content from each of the plurality of content URLs 146. The CPU 14 will proceed to S294 when S292 is completed.

In S294, the CPU 14 will send an electronic mail that includes the content downloaded in S292 as an attached file (S294). Here, the destination of the electronic mail will change in response to the determination results in S280 and S286. For example, if the answer was determined to be NO in S280, the CPU 14 will send an electronic mail to the electronic mail address selected by a user in S284 as the destination. In addition, for example, in the event the answer was determined to be YES in S280, and the answer was determined to be NO in S286, the CPU 14 will send an electronic mail to the electronic mail address selected by a user in S290 as the destination. In addition, for example, in the event the answer was determined to be NO in S280, and the answer was determined to be YES in S286, the CPU 14 will send an electronic mail to the electronic mail address (one electronic mail address) associated with the host name selected by a user in S252 of FIG. 16 as the destination. When S294 has been completed, the mail sending process will be terminated.

The multi-function device system 2 of the present embodiment has been described in detail. When a PC having a host name that was not selected by a user in S252 of FIG. 16 is not running, the multi-function device 10 will download the content and send an electronic mail that includes that content. A user can view the content included in the electronic mail. Because the content itself is sent in an electronic mail (because this is not a configuration that sends the content URL 146), a user can reliably view the content even though there is a time lag between when the electronic mail was sent and the time that electronic mail is viewed by the user.

The multi-function device 10 will not execute the process to download the content (see S294 of FIG. 17) in the event the answer was YES in S256 of FIG. 16. According to this configuration, the burden on the multi-function device 10 (e.g., the burden on the memory) can be reduced because the item of content will not be acquired if the content is not needed.

In addition, the multi-function device 10 allows a user to select a plurality of titles in S128 of FIG. 15. When a plurality of titles is selected by a user, the multi-function device 10 will not execute the process of sending the content URLs 146 (see S258 of FIG. 16), but instead will execute the mail sending process (see S260 of FIG. 16). In particular, because the PCs 70, 71 of the present embodiment will launch a browser for each content URL 146 received, the burden on the PCs 70, 71 will increase as the number URLs sent from the multi-function device 10 increases. According to the present embodiment, because a plurality of content URLs 146 is prevented from being sent to the PCs 70, 71, a large burden on the PCs 70, 71 can be prevented.

In addition, the multi-function device 10 can associate and store a plurality of electronic mail addresses 157-159 with one host name 155. A user can associate the plurality of electronic mail addresses 157-159 that he or she uses with the host name of the PC that he or she uses (e.g. PC 70). If a plurality of electronic mail addresses are associated with a host name selected by a user in S252 of FIG. 16, the multi-function device 10 will permit the user to select at least one electronic mail address from amongst these. In addition, if an electronic mail address is not associated with a host name selected by a user in S252 of FIG. 16, the multi-function device 10 will permit a user to select at least one electronic mail address from all electronic mail addresses stored in the PC information storage area 46. The multi-function device 10 can send an electronic mail to the electronic mail address selected by a user as the destination.

(1) In the aforementioned embodiment, each of the content servers 90, 91 store both content and feed information. However, a configuration is also possible in which one server stores items of content and another server stores feed information.

(2) The aforementioned multi-function device 10 does not have a browser program. However, the multi-function device 10 may have a browser program. The multi-function device 10 may download a content for display on the display panel 50. For example, information related to the multi-function device 10 may be displayed in a list displayed on the display panel 50 in S184 of FIG. 11. If the multi-function device 10 is selected from the list, the multi-function device 10 may download a content and display it on the display panel 50.

(3) The default information storage area 46 of the NVRAM 40 (see FIG. 2) need not be present. In this case, in the event the answer is YES in S174 of FIG. 12, the CPU 14 may skip S176 to S182 of FIG. 12, and execute S184.

Figure 12:
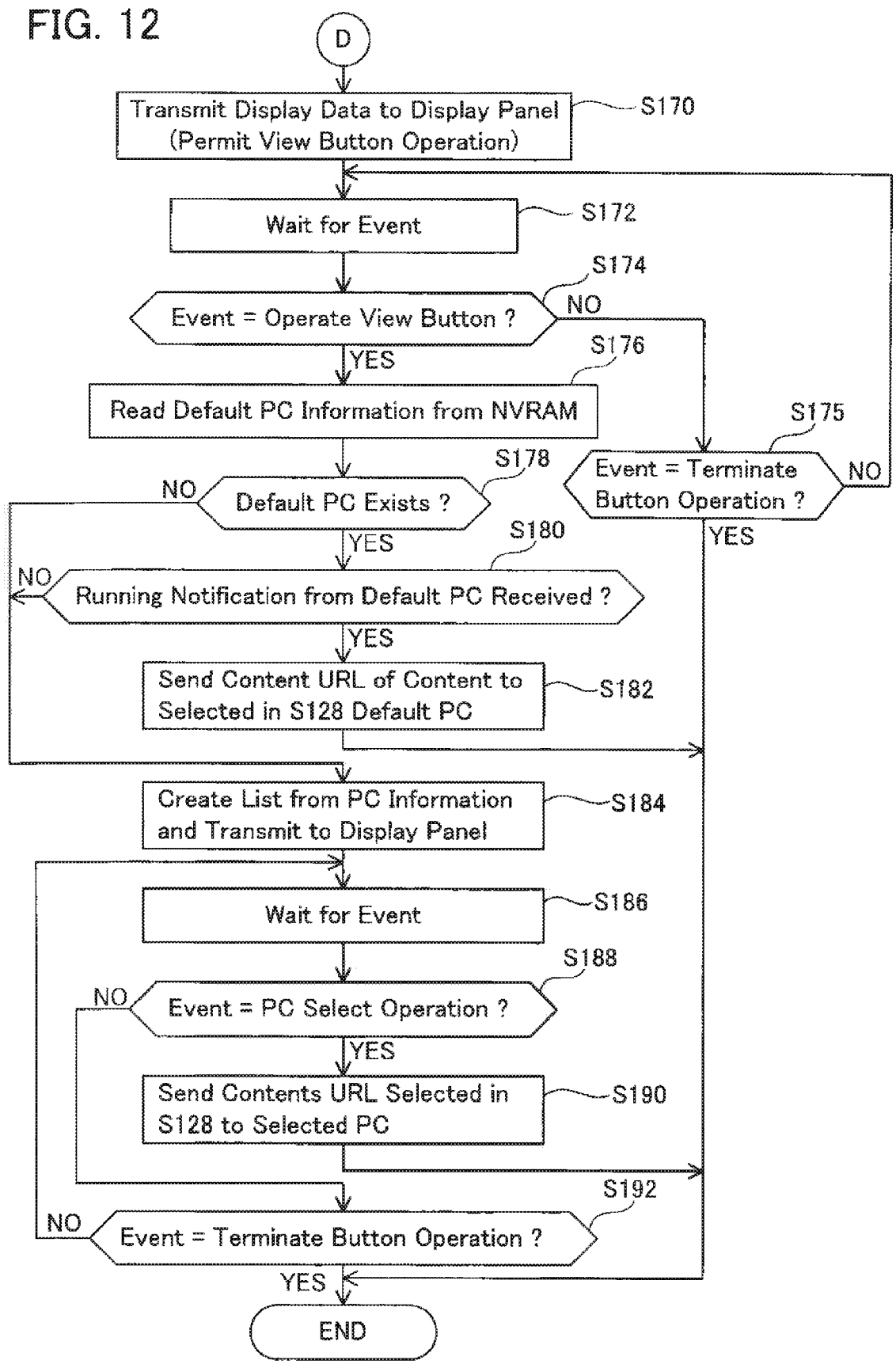
FIG. 12 shows the continuation of the flowchart of FIG. 11.

(4) In the event the answer is NO in S178 of FIG. 12, the CPU 14 need not execute the process after S184. In other words, the list 190 shown in the illustration in the lowermost portion of FIG. 13 need not be displayed. With this modification, if the PC stored in the default PC information storage area 46 is not running, the content URL 146 will not be sent to any PC.

(5) The multi-function device 10 may permit a user to select a plurality of host names in S252 of FIG. 16. In this case, if any one of the plurality of host names selected by the user is running, the multi-function device 10 may determine that the answer is YES in S256 in FIG. 16. In addition, if any one of the plurality of host names selected by the user is associated with an electronic mail address, the multi-function device 10 may determine that the answer is YES in S280 in FIG. 17.

(6) The determination process of S254 of FIG. 16 need not be present. In addition, in the event the answer is NO in S280 of FIG. 17, the multi-function device 10 may skip the later portions of the process and not send an electronic mail. In addition, in the event the answer is YES in S280 of FIG. 17, the multi-function device 10 need not execute the determination process of S286 of FIG. 17. In this case, the multi-function device 10 may send an electronic mail to all electronic mail addresses associated with the host name selected by a user in S252 of FIG. 16.

(7) In addition, the multi-function device 10 was described as an example in the aforementioned embodiments, but technique disclosed in the present application may be adopted in a fax machine, printer, etc.

A part of the technique disclosed in the above embodiments will be described. The communication device may further comprise an address information specification unit configured to specify, from the summarized content information, address information of the content corresponding to the selected title. In addition, the sending unit may be configured to send the information concerning the content corresponding to the selected title by sending the address information specified by the address information specification unit.

The communication device may further comprise an information receiving unit. The information receiving unit may be configured to receive specific information from the information display device. In addition, the sending unit may be configured to send the address information specified by the address information specification unit to the information display device on a condition that the specific information from the information display device is received by the information receiving unit. If the information display device is not running, the specific information will not be received from the information display device. The communication device can know whether or not the information display device is running by receiving the specific information from the information display device. With this configuration, the address information of the content can be sent to the information display device when the information display device is running. Note that the aforementioned term "on a condition" does not exclude the addition of other conditions (an AND condition and/or an OR condition). When the term "on a condition" is used, other conditions may be included. The term "on a condition" will have the same meaning hereinafter. Note that the timing at which the information display device sends the aforementioned specific information to the communication device is not particularly limited. The information display device may, for example, be configured to send the aforementioned specific information to the communication device when it is running. In addition, the information display device may be configured such that the communication device sends a signal to the information display device at a specific timing, and the information display device will send the aforementioned specific information to the communication device in response thereto.

The communication device may further comprise an identification information storage unit. The identification information storage unit may be configured to store identification information of the information display device. The aforementioned term "identification information" is a concept including any information that can identify the information display device. Examples of identification information include an IP address, a MAC address, a device name, a host name, a user name, etc. Note that the identification information storage unit may be configured to store identification information input by a user, or may be configured to store identification information in advance (e.g., set by a vendor). When information is to be sent from the information display device to the communication device, that information will include identification information for the information display device. The sending unit may be configured to send the address information specified by the address information specification unit to the information display device on a condition that the specific information including the identification information stored in the identification information storage unit is received by the information receiving unit.

The communication device may be shared by a plurality of users. In this case, the communication device may be connected in a communicable manner to the information display devices used by each of the plurality of users (i.e., a plurality of information display devices). In this case, the communication device may further comprise an information receiving unit, a device information display device, and a device selecting unit. The information receiving unit may be configured to receive the specific information from each of the information display devices. The device information display unit may be configured to display device information concerning at least one information display device which is the source of the specific information received by the information receiving unit. The device selecting unit may be configured to allow the user to select at least one information display device from the device information displayed on the device information display unit. In this case, the sending unit may be configured to send the address information specified by the address information specification unit to the selected information display device. According to this configuration, the destination of the address information of the content can be selected by the user.

For example, when the specific information is received by the information receiving unit from only one information display device, the user can only select that information display device temporarily, even if information concerning that information display device is displayed on the device information display unit. Thus, when the specific information is received by the information receiving unit from only one information display device, a configuration can be adopted in which address information specified by the address information specification unit will be automatically sent to that information display device (a configuration in which the user cannot select). This configuration may be adopted, however in this case, there is a possibility that the address information of the content will be sent to an information display device not desired by a user. Because of this, the device information display unit may be configured to display the device information concerning one information display device even in a case where the specific information sent only from the one information display device is received by the information receiving unit. The sending unit may be configured to send the address information specified by the address information specification unit to the information display device on a condition that the one information display device is selected in the device selecting unit. According to this configuration, a phenomenon can be prevented from occurring in which the address information of the content is sent to an information display device not desired by a user.

The communication device may further comprise an operation portion display unit. The operation portion display unit may be configured to display an operation portion. The operation portion may be displayed in a first display pattern or a second display pattern which is different from the first display pattern. The operation portion in the first display pattern may be displayed on a condition that the specific information from at least one of the plurality of information display devices is received by the information receiving unit. The operation portion in the second display pattern may be displayed on a condition that specific information from any of the plurality of information display devices is not received by the information receiving unit. The device information display unit may be configured to display the device information of the at least one information display device which is the source of the specific information received by the information receiving unit on a condition that the operation portion displayed in the first display pattern is operated. With this configuration, the display pattern of the operation portion will change in response to the presence or absence of information display device that is running. Because of this, a user can easily know whether the information display device that is running is present.

The communication device may further comprise an identification information storage unit, a first determination unit, and a second determination unit. The identification information storage unit may be configured to store identification information of at least one information display device. The first determination unit may be configured to determine whether the specific information including predetermined identification information stored in the identification information unit is received by the information receiving unit. The second determination unit may be configured to determine whether the specific information including identification information other than the identification information stored in the identification information storage unit is received by the information receiving unit. The sending unit may be configured to send the address information specified by the address information specification unit to the information display device corresponding to the predetermined identification information on a condition that an affirmative determination is made by the first determination unit. In addition, the device information display unit may be configured to display the device information concerning the information display device which is the source of the specific information received by the information receiving unit on a condition that a negative determination is made by the first determination unit and an affirmative determination is made by the second determination unit. With this configuration, for example, identification information for the information display device desired by the user (the default information display device) can be stored in the identification information storage unit as the destination of the address information of the content. The address information of the content can be sent to the default information display device when the default information display device is running. In contrast, the destination of the address information of the content can be selected by the user when the default information display device is not running.

Note that the address information storage unit may be configured to store address information of only one item of summarized content information, or may be configured to store respective address information of a plurality of summarized content information. In the later case, the summarized information acquisition unit may be configured to acquire the plurality of summarized content information from the respective address information stored in the address information storage unit. The title display unit may be configured to display the titles included in the plurality of summarized content information acquired by the summarized information acquisition unit.

The communication device may further comprise a destination storage unit, a running determination unit, and a content acquisition unit. The destination storage unit may be configured to store a device address of the information display device and an electronic mail address. The aforementioned term "device address" is a concept including any information that can specify an information display device. Examples of a device address include an IP address, a node name, a host address, a MAC address, etc. The running determination unit may be configured to determine whether the information display device is running. The content acquisition unit may be configured to acquire the content from the address information specified by the address information specification unit. Note that the content acquisition unit may be configured to acquire the content after the running determination unit has made a negative determination, or may be configured to acquire the content before the determination by the running determination unit has occurred (i.e., regardless of whether there is an information display device that is running). The sending unit may be configured to send the information concerning the content corresponding to the selected title by sending an electronic mail including the content acquired by the content acquisition unit to the electronic mail address stored in the destination storage unit on a condition that a negative determination is made by the running determination unit. Note that the aforementioned phrase "electronic mail including the content" may be an electronic mail in which the content is written therein as text, or may be an electronic mail including the content attached as a file. The sending unit may be configured to send the information concerning the content corresponding to the selected title by sending the address information specified by the address information specification unit to the device address stored in the destination storage unit on a condition that an affirmative determination is made by the running determination unit.

Note that when the information display device is not running, a user cannot view the content, even if the address information of the content is sent to the information display device. According to the above configuration, when the information display device is not running, the communication device will send the electronic mail that includes the content. A user can view the content included in the electronic mail. For example, a configuration in which an electronic mail including the address information specified by the address information specification unit is sent can also be considered. However, after the electronic mail has been sent from the communication device, it may take time until the user views the electronic mail. During this time, the details of the content may change, or the content may be deleted, in the content server. Thus, when a configuration is adopted that sends an electronic mail including the address information of the content, even if a user receives the electronic mail and accesses the address information of the content, this content may have already changed (or that content may have been deleted). In contrast, according to the above configuration, because the communication device acquires the content and sends the electronic mail including the content, the user can view the content corresponding to a title selected in the communication device by viewing the electronic mail. Note that this disclosure does not preclude sending an electronic mail that includes both the content and the address information of the content.

When a positive determination has been made by the running determination unit, it will not be necessary to acquire the content because the address information of the content will be sent to the information display device. Thus, the content acquisition unit may be configured to acquire the content from the address information specified by the address information specification unit on the condition that the negative determination is made by the running determination unit, and does not acquire the content from the address information specified by the address information specification unit on the condition that the affirmative determination is made by the running determination unit. According to this configuration, the load on the communication device (e.g., the load on the memory) can be reduced because the content will not be acquired when the content is not needed.

Note that the communication device may be configured such that a plurality of titles is selected by a user, and a plurality of address information specified by the address information specification unit will be sent to the information display device. However, when this configuration is adopted, the information display device must access each of the plurality of address information, and this is a big burden. Because of this, the following configuration may be adopted. The sending unit may be configured to send, on a condition that the affirmative determination is made by the running determination unit and only one title is selected in the title selecting unit, the address information specified by the address information specification unit to the device address stored in the destination storage unit. In addition, the sending unit may be configured to send, even in a case where the affirmative determination is made by the running determination unit, an electronic mail including a plurality of contents acquired by the content acquisition unit to the electronic mail address stored in the destination storage unit on a condition that a plurality of titles is selected in the title selecting unit. According to this configuration, a large load on the information display device can be prevented because a plurality of address information is prohibited from being sent to the information display device.

On a condition that the communication device is connected with a plurality of information display devices in a communicable manner, the destination storage unit may be configured to store respective device addresses of the plurality of the information display devices. In this case, the running determination unit may be configured to determine whether the information display device selected in the device selecting unit is running. In this case, the sending unit may be configured to send the address information specified by the address information specification unit to the device address of the information display device selected in the device selecting unit on the condition that the affirmative determination is made in the running determination unit. According to this configuration, the communication device can send the address information of the content to the information display device selected by the user (e.g., an information display device employed by this user).

The destination storage unit may be configured to store, for each of the plurality of information display devices, an association of an electronic mail address of the information display device and a device address of the information display device. The sending unit may be configured to send the electronic mail including the content acquired by the content acquisition unit to the electronic mail address associated with the device address of the information display device selected in the device selecting unit on the condition that the negative determination is made by the running determination unit. According to this configuration, each user can associate the device address of the information display device that he or she uses with the electronic mail address that he or she uses. The communication device can send the content to an electronic mail address employed by the user on the condition that the information display device selected by that user is not running (e.g., the information display device used by that user).

The communication device may further comprise a first address selecting unit. The first address selecting unit may be configured to allow the user to select at least one electronic mail address from all of the electronic mail addresses stored in the destination storage unit on a condition that the electronic mail address is not associated with the device address of the information display device selected in the device selecting unit. The sending unit may be configured to send the electronic mail including the content acquired by the content acquisition unit to the electronic mail address selected in the first address selecting unit on the condition that the negative determination is made by the running determination unit. According to this configuration, the user can select an electronic mail address on the condition that the electronic mail address is not associated with the information display device selected by the user. The communication device can send the content to the electronic mail address selected by the user.

The communication device may further comprise a second address selecting unit. The destination storage unit may be configured to store a plurality of electronic mail addresses associated with one device address. The second address selecting unit may be configured to allow the user to select at least one electronic mail address from the plurality of electronic mail addresses on a condition that the plurality of electronic mail addresses is associated with the device address of the information display device selected in the device selecting unit. The sending unit may be configured to send the electronic mail including the content acquired by the content acquisition unit to the electronic mail address selected in the second address select unit on the condition that the negative determination is made by the running determination unit. The sending unit may be configured to send an electronic mail including the content acquired by the content acquisition unit to one electronic mail address on a condition that the negative determination is made by the running determination unit and only the one electronic mail address is associated with the device address of the information display device selected in the device selecting unit. For example, the user may use a plurality of electronic mail addresses. According to this configuration, an information display device employed by a user can be associated with a plurality of electronic mail addresses employed by that user. The user can select the destination of an electronic mail from a plurality of electronic mail addresses that he or she uses.

The sending unit may be configured to send an electronic mail including the information concerning the content corresponding to the selected title to the information display device.

The term "content" may be restated as "one information in a plurality of information within a site". Each of the plurality of information corresponds to one URL. Thus, "content" may also be restated as "information corresponding to one URL within a site". In addition, "summarized content information" may be restated as "feed information".

The summarized content information may include site information. The site information may include the title of the site. The summarized content information may include, for each of a plurality of contents, a title letter string of the content and the URL of the content. The summarized content information may also include, for each of a plurality of contents, information indicating the time at which the content was updated. The summarized content information may also include, for each of a plurality of contents, a summary letter string in which the letter string of the content has been summarized. The summary letter string may be a larger letter string than the title of the content, and may be a smaller letter string than the entire letter string of the content.

The communication device may sequentially display the title of each content. The communication device may display a list of the title of each content on a condition that a first operation is performed when the title of each content is sequentially displayed. The communication device may also display a summary letter string of the content corresponding to the title selected from the list. The communication device may also send address information of the content to the information display device (or send an electronic mail that includes the content) on a condition that a second operation is performed when the summary letter string of the content is displayed.

The communication device may also periodically access the address information of the summarized content information (e.g., a URL etc.) in accordance with a predetermined update timing. In this way, the communication device can acquire the latest summarized content information.

The information display device may be configured such that a software for sending running information to the communication device can be installed. The information display device may also have a storage area for storing information (e.g., an IP address, MAC address, unit name, etc.) related to the communication device that is the destination of the running information. The information display device may also be configured to periodically send running information to the communication device while running. The communication device can know whether the information display device is running by monitoring the receipt of the running information.

What is claimed is:

1. A communication device configured to connect to a plurality of information display devices in a communicable manner, the communication device comprising:
   a display panel;
   a processor; and
   memory storing computer readable instructions that, when executed, cause the communication device to perform:
   receiving specific information from each of the plurality of information display devices;
   storing a plurality of device information corresponding to the plurality of information display devices from which the specific information is received;
   storing a first URL of feed information, the feed information including, for each of a plurality of contents, at least a second URL of a content, a title of the content, and a summarized content letter string, the summarized content letter string being summarized a letter string of the content, a large letter string than a letter string of the title, and a smaller letter string than the letter string of the content;
   acquiring the feed information by using the stored first URL;
   displaying, on the display panel, the titles of the plurality of contents included in the acquired feed information;
   receiving a first instruction selecting a title from the displayed titles of the plurality of contents;
   displaying, on the display panel, in response to receiving the first instruction, the summarized content letter string corresponding to the selected title and included in the acquired feed information;
   receiving a second instruction while the summarized content letter string is displayed;
   displaying, on the display panel, stored the plurality of device information corresponding to the plurality of information display devices;
   receiving a third instruction selecting at least one device information from among the plurality of displayed device information; and
   sending, in response to receiving the second instruction, a second URL of a content corresponding to the selected title to selected at least one information display device corresponding to the selected at least one device information, without sending the content corresponding to the selected title, the second URL being accessed for acquiring the content corresponding to the selected title by the selected information display device.

2. The communication device according to claim 1, wherein the computer readable instructions, when executed, further cause the communication device to provide:
   specifying, from the feed information, the second URL of the content corresponding to the selected title,
   wherein the sending of the second URL includes sending the specified second URL of the content corresponding to the selected title.

3. The communication device according to claim 2, wherein
   the sending of the second URL includes sending the specified second URL to the information display device on a condition that the specific information from the information display device is received.

4. The communication device according to claim 3, wherein the computer readable instructions, when executed, further cause the communication device to provide:
   storing identification information of the information display device,
   wherein the sending of the second URL includes sending the specified second URL to the information display device on a condition that the specific information including the stored identification information is received.

5. The communication device according to claim 2, wherein
   the displaying of the device information includes displaying the device information corresponding to one information display device even in a case where the specific information sent only from the one information display device is received, and
   the sending of the second URL includes sending the specified second URL to the information display device on a condition that the one information display device is selected.

6. The communication device according to claim 2, wherein the computer readable instructions, when executed, further cause the communication device to perform:
   displaying an operation portion on the display panel, the operation portion being displayed in a first display pattern or a second display pattern which is different from the first display pattern, wherein the operation portion in the first display pattern is displayed on a condition that the specific information from at least one of the plurality of information display devices is received, and the operation portion in the second display pattern is displayed on a condition that the specific information from any of the plurality of information display devices is not received,
   wherein the displaying of the device information includes displaying the device information of the at least one information display device which is the source of the received specific information on a condition that the operation portion displayed in the first display pattern is operated.

7. The communication device according to claim 2, wherein the computer readable instructions, when executed, further cause the communication device to perform:
   storing identification information of at least one information display device;
   determining whether the specific information including stored predetermined identification information is received; and
   determining whether the specific information including identification information other than the stored identification information is received,
   wherein the sending of the second URL includes sending the specified second URL to the information display device corresponding to the predetermined identification information on a condition that an affirmative determination is made in the determining of whether the specific information including stored predetermined identification information is received, and
   the displaying of the device information includes displaying the device information corresponding to the information display device which is the source of the received specific information on a condition that a negative determination is made in the determining of whether the specific information including stored predetermined identification information is received and an affirmative determination is made in the determining of whether the specific information including identification information other than the stored identification information is received.

8. The communication device according to claim 1, wherein
- the storing of the first URL includes storing respective first URLs of a plurality of summarized content information,
- the acquiring of the feed information includes acquiring the plurality of feed information from the stored respective first URLs, and
- the displaying of the title includes displaying the titles included in the acquired plurality of feed information.

9. The communication device according to claim 1, wherein the computer readable instructions, when executed, further cause the communication device to perform:
- determining whether the information display device is running,
- wherein the sending of the second URL includes sending the second URL of the content corresponding to the selected title on a condition that an affirmative determination is made in the determining of whether the information display device is running, and
- wherein the sending of the second URL includes not sending the second URL of the content corresponding to the selected title on a condition that a negative determination is made in the determining of whether the information display device is running.

10. The communication device according to claim 1, wherein the computer readable instructions, when executed, further cause the communication device to perform:
- storing, in response to the feed information being acquired, the feed information,
- wherein the storing of the feed information includes replacing stored feed information with the acquired feed information.

11. A communication device configured to connect to a plurality of information display devices in a communicable manner via a LAN, the communication device comprising:
- a display panel;
- a processor; and
- memory storing computer readable instructions that, when executed, cause the communication device to perform:
  - receiving specific information from each of the plurality of information display devices;
  - storing a plurality of device information corresponding to the plurality of information display devices from which the specific information is received and an electronic mail address;
    - storing a first URL of feed information, the feed information including, for each of a plurality of contents, at least a second URL of a content and a title of the content;
  - acquiring the feed information using the stored first URL;
  - displaying, on the display panel, the titles of the plurality of contents included in the acquired feed information;
  - receiving an instruction selecting at lease one title from the displayed titles of the plurality of contents;
  - displaying, on the display panel, stored the plurality of device information corresponding to the plurality of information display devices;
  - receiving an instruction selecting at least one device information from among the plurality of displayed device information;
  - in a first predetermined case, in response to receiving the instruction selecting the at least one title, sending an electronic mail including information concerning the content corresponding to the selected at least one title to the electronic mail address; and
  - in a second predetermined case which is different from the first predetermined case, in response to receiving the instruction selecting the at least one title, sending a second URL of a content corresponding to the selected at least one title to selected at least one information display device corresponding to the selected at least one device information via the LAN, without sending the content corresponding to the selected at least one title, the second URL of the content corresponding to the selected at least one title being to be accessed for acquiring the content corresponding to the selected at least one title by the selected information display device.

12. A communication device configured to connect to a plurality of information display devices in a communicable manner via a LAN, the communication device comprising:
- a display panel;
- a processor; and
- memory storing computer readable instructions that, when executed, cause the communication device to perform:
  - receiving specific information from each of the plurality of information display devices;
  - storing a plurality of device information corresponding to the plurality of information display devices from which the specific information is received, and a plurality of electronic mail addresses corresponding to the plurality of device information;
    - storing a first URL of feed information, the feed information including, for each of a plurality of contents, at least a second URL of a content and a title of the content;
  - acquiring the feed information using the stored first URL;
  - displaying, on the display panel, the titles of the plurality of contents included in the acquired feed information;
  - receiving an instruction selecting at least one title from the displayed titles of the plurality of contents;
  - displaying, on the display panel, stored the plurality of device information corresponding to the plurality of information display devices;
  - receiving an instruction selecting at least one device information from among the plurality of displayed device information; and
  - determining whether the selected at least one information display device is running;
  - in response to receiving the instruction selecting the at least one title, specifying, from the feed information, a second URL of a content corresponding to the selected at least one title;
  - acquiring the content from the specified second URL;
  - sending an electronic mail including the acquired content to the selected at least one information display device corresponding to the selected at least one device information, by using an electronic mail address corresponding to the selected at least one device information, on a condition that a negative determination is made in the determining of whether the selected at least one information display device is running; and
  - sending the specified second URL to the selected at least one information display device corresponding to the selected at least one device information, via the LAN, on a condition that an affirmative determination is made in the determining of whether the selected at least one information display device is running.

13. The communication device according to claim 12, wherein
the acquiring of the content includes acquiring the content from the specified second URL on the condition that the negative determination is made in the determining of whether the information display device is running, and not acquiring the content from the specified second URL on the condition that the affirmative determination is made in the determining of whether the information display device is running.

14. The communication device according to claim 12, wherein
the sending of the specified second URL includes sending, via the LAN, on a condition that the affirmative determination is made in the determining of whether the information display device is running and only one title is selected, the specified second URL to the selected at least one information display device, and
the sending of the information concerning the content includes sending, even in a case where the affirmative determination is made in the determining of whether the information display device is running, an electronic mail including an acquired plurality of contents to the selected at least one information display device on a condition that a plurality of titles is selected.

15. The communication device according to claim 12, wherein the computer readable instructions, when executed, further cause the communication device to perform:
receiving an instruction selecting at least one electronic mail address from all of the stored electronic mail addresses on a condition that an electronic mail address does not correspond to the selected device information, and
the sending of electronic mail includes sending the electronic mail including the acquired content by using the selected electronic mail address on the condition that the negative determination is made in the determining of whether the information display device is running.

16. The communication device according to claim 12, wherein
the storing of the plurality of device information and the plurality of electronic mail addresses includes storing a plurality of electronic mail addresses corresponding to one device information,
wherein the computer readable instructions, when executed, further cause the communication device to perform:
receiving an instruction selecting at least one electronic mail address from the plurality of electronic mail addresses on a condition that the plurality of electronic mail addresses corresponds to the selected device information, wherein
the sending of the electronic mail includes sending the electronic mail including the acquired content to the selected electronic mail address on the condition that the negative determination is made in the determining of whether the information display device is running, and
the sending of the electronic mail includes sending the electronic mail including the acquired content to one electronic mail address on a condition that the negative determination is made in the determining of whether the information display device is running and only one electronic mail address corresponds to the selected device information.

\* \* \* \* \*